US010754238B2

(12) United States Patent
Nagatoshi

(10) Patent No.: US 10,754,238 B2
(45) Date of Patent: Aug. 25, 2020

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/366,344

(22) Filed: Mar. 27, 2019

(65) Prior Publication Data
US 2019/0302601 A1 Oct. 3, 2019

(30) Foreign Application Priority Data
Mar. 28, 2018 (JP) .................. 2018-062316

(51) Int. Cl.
G03B 21/28 (2006.01)
(52) U.S. Cl.
CPC .................. G03B 21/28 (2013.01)
(58) Field of Classification Search
CPC .... G03B 21/006; G03B 21/008; G03B 21/28; G03B 21/142; G03B 21/147; G03B 21/208; G02B 17/002; G02B 17/008; G02B 17/045; G02B 17/0636; G02B 17/0816
See application file for complete search history.

(56) References Cited

U.S. PATENT DOCUMENTS

| 2006/0028715 | A1* | 2/2006 | Kato | G02B 17/08 359/365 |
| 2014/0036142 | A1* | 2/2014 | Inoko | G02B 3/00 348/369 |
| 2016/0246034 | A1* | 8/2016 | Amano | G02B 13/16 |
| 2016/0246037 | A1* | 8/2016 | Amano | G02B 17/008 |
| 2016/0342075 | A1 | 11/2016 | Peterson et al. | |
| 2016/0370692 | A1* | 12/2016 | Ode | G02B 27/0025 |
| 2017/0068153 | A1* | 3/2017 | Ikeura | G03B 21/147 |
| 2018/0059389 | A1* | 3/2018 | Inoue | G02B 15/163 |
| 2018/0059390 | A1* | 3/2018 | Nagahara | G02B 15/177 |
| 2018/0164554 | A1 | 6/2018 | Shiokawa et al. | |
| 2018/0321475 | A1 | 11/2018 | Amano | |

FOREIGN PATENT DOCUMENTS

JP 5978121 B2 8/2016
JP 2016-156986 A 9/2016

* cited by examiner

Primary Examiner — Sultan Chowdhury
(74) Attorney, Agent, or Firm — Studebaker & Brackett PC

(57) ABSTRACT

The imaging optical system consists of, in order from a magnification side along an optical axis: a first lens group; a first optical axis deflection unit that deflects the optical axis; a second lens group; a second optical axis deflection unit that deflects the optical axis; and a third lens group. The imaging optical system forms an intermediate image between the first optical axis deflection unit and a surface closest to the magnification side in the first lens group.

12 Claims, 22 Drawing Sheets

EXAMPLE 1

EXAMPLE 1

EXAMPLE 1

EXAMPLE 2

EXAMPLE 3

EXAMPLE 5

EXAMPLE 6

EXAMPLE 7

EXAMPLE 8

EXAMPLE 1

IMAGING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2018-062316 filed on Mar. 28, 2018. The above application is hereby expressly incorporated by reference, in its entirety, into the present application.

BACKGROUND OF THE INVENTION

1. Field of the Invention

The present invention relates to an imaging optical system forming an intermediate image, a projection display device comprising the imaging optical system, and an imaging apparatus comprising the imaging optical system.

2. Description of the Related Art

In the past, projection display devices, each of which uses a light valve such as a liquid crystal display element or a digital micromirror device (DMD: registered trademark) display element, have come into widespread use.

In such a type of the projection display device, it is necessary to increase the degree of freedom in setting the distance to the screen and further improve installability in the indoor space. Therefore, there is an increase in demand for a highly versatile imaging optical system having a small size, a higher performance, and a wider angle to be mounted in a projection display device.

An imaging optical system, which forms an intermediate image at a position conjugate to the reduction side imaging surface and re-forms the intermediate image on the magnification side imaging surface, has been proposed so as to cope with such demands (for example, JP5978121B and JP2016-156986A).

SUMMARY OF THE INVENTION

As described above, it is necessary to achieve reduction in size of the projection display device. Therefore, in the imaging optical systems of JP5978121B and JP2016-156986A, two optical axis deflection units such as mirrors are provided in the imaging optical system so as to deflect the optical axis of the imaging optical system by 180 degrees.

In the imaging optical system of JP5978121B, two mirrors are disposed in the space between the same lenses. Therefore, in such a configuration, it is difficult to provide mirrors each having a sufficient size for the rays passing through the imaging optical system, and rays in only one side region of regions located with the optical axis interposed therebetween can be used for projecting an image. Therefore, in the projection display device, a problem arises in that the adjustment range of the projection range becomes narrow.

Further, in the imaging optical system of JP2016-156986A, the mirrors are disposed to be closer to the magnification side than a position of the intermediate image. Therefore, the size of the optical system, which includes this mirror and is closer to the magnification side than the intermediate image, is set to be large.

The present invention has been made in consideration of the above-mentioned situations, and it is an object of the present invention to provide an imaging optical system forming an intermediate image, a projection display device comprising the imaging optical system, and an imaging apparatus comprising the imaging optical system. The imaging optical system is capable of using rays in both regions located with the optical axis interposed therebetween while having a small size.

An imaging optical system of the present invention forms an intermediate image at a position conjugate to a magnification side imaging surface and re-forms the intermediate image on a reduction side imaging surface. The imaging optical system consists of, in order from a magnification side along an optical axis: a first lens group; a first optical axis deflection unit that deflects the optical axis; a second lens group; a second optical axis deflection unit that deflects the optical axis; and a third lens group. The intermediate image is formed between the first optical axis deflection unit and a surface closest to the magnification side in the first lens group.

In the imaging optical system of the present invention, it is preferable that the second lens group has a positive refractive power.

Further, the intermediate image may be formed between a surface closest to the magnification side in the first lens group and a surface closest to a reduction side in the first lens group. The intermediate image may be formed between the first optical axis deflection unit and a surface closest to a reduction side in the first lens group.

Further, assuming that a focal length of a whole system is f and a focal length of the second lens group is f2, it is preferable to satisfy Conditional Expression (1). It is more preferable to satisfy Conditional Expression (1-1).

$$0 < |f|/f2 < 0.1 \tag{1}$$

$$0.02 < |f|/f2 < 0.07 \tag{1-1}$$

Further, assuming that a distance on the optical axis from a surface closest to the magnification side in the first lens group to the first optical axis deflection unit is La and a distance on the optical axis from the second optical axis deflection unit to a surface closest to a reduction side in the third lens group is Lb, it is preferable to satisfy Conditional Expression (2). It is more preferable to satisfy Conditional Expression (2-1).

$$1.2 < La/Lb < 5 \tag{2}$$

$$1.5 < La/Lb < 4 \tag{2-1}$$

Further, it is preferable that the optical axis of the third lens group is deflected by 180° with respect to the optical axis of the first lens group.

In such a case, it is preferable that the first lens group, the first optical axis deflection unit, the second lens group, and the second optical axis deflection unit are integrally rotatable about the optical axis of the third lens group as a rotation axis.

Further, it is preferable that the first optical axis deflection unit and the second optical axis deflection unit deflect the optical axis by 90°.

A projection display device of the present invention comprises: a light valve from which an optical image is output based on image data; and the above-mentioned imaging optical system of the present invention. The imaging optical system projects the optical image, which is output from the light valve, onto a screen.

An imaging apparatus of the present invention comprises the above-mentioned imaging optical system of the present invention.

It should be noted that the term "consists of ~" means that the system may include not only the above-mentioned elements but also lenses substantially having no powers, optical elements, which are not lenses, such as a stop, a mask, a cover glass, a filter, a mirror, and a prism, and mechanism parts such as a lens flange, a lens barrel, an imaging element, and a camera shaking correction mechanism.

Further, the term "lens group" means that it may include not only a lens, but also optical elements other than a lens such as a stop, a mask, a cover glass, a filter, a mirror, and a prism.

Further, among the symbols of the respective conditional expressions, the focal length means a focal length in a case where the distance from the magnification side imaging surface to the first lens group is infinite.

The imaging optical system of the present invention forms an intermediate image at a position conjugate to a magnification side imaging surface and re-forms the intermediate image on a reduction side imaging surface. The imaging optical system consists of, in order from a magnification side along an optical axis: a first lens group; a first optical axis deflection unit that deflects the optical axis; a second lens group; a second optical axis deflection unit that deflects the optical axis; and a third lens group. The intermediate image is formed between the first optical axis deflection unit and a surface closest to the magnification side in the first lens group. Therefore, it is possible to provide an imaging optical system, a projection display device comprising the imaging optical system, and an imaging apparatus comprising the imaging optical system. The imaging optical system is capable of using rays in both regions located with the optical axis interposed therebetween while having a small size.

DESCRIPTION OF THE PREFERRED EMBODIMENTS

Figure 1:
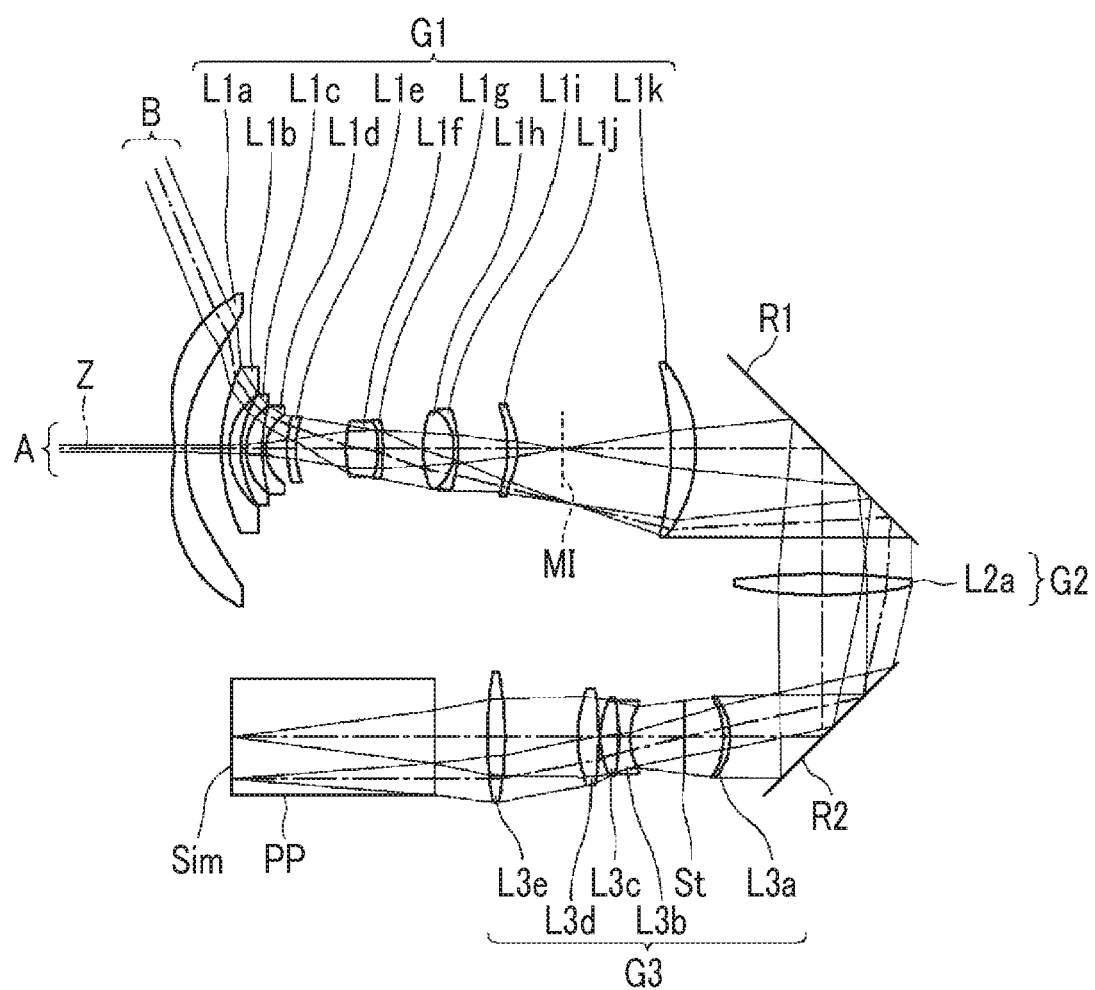
FIG. 1 is a cross-sectional view illustrating a lens configuration of an imaging optical system (common to Example 1) according to an embodiment of the present invention.

Hereinafter, an embodiment of the present invention will be described in detail with reference to the drawing. FIG. 1 is a cross-sectional view illustrating a lens configuration of an imaging optical system according to an embodiment of the present invention. The exemplary configuration shown in FIG. 1 is the same as the configuration of the imaging optical system of Example 1 to be described later. In FIG. 1, in a case where the optical axis is expanded, it is assumed that the left side is the magnification side and the right side is the reduction side. It should be noted that the aperture stop St shown in the drawing does not necessarily indicate its size and shape, and indicates a position of the stop on the optical axis Z. Further, on-axis rays A and rays with the maximum angle of view B as the rays are denoted.

This imaging optical system is, for example, mounted on a projection display device, and can be used to project image information displayed on the light valve onto the screen. In FIG. 1, assuming that the imaging optical system is mounted on a projection display device, an optical member PP such as a filter or a prism used in a color synthesizing section or an illumination light separating section, and an image display surface Sim of a light valve are also shown. In the projection display device, rays, which are made to have image information through the image display element disposed on the image display surface Sim, are incident into the imaging optical system through the optical member PP, and are projected onto a screen, which is not shown in the drawing, through the imaging optical system.

As illustrated in FIG. 1, an imaging optical system forms an intermediate image MI at a position conjugate to a magnification side imaging surface and re-forms the intermediate image MI on a reduction side imaging surface (image display surface Sim). The imaging optical system consists of, in order from a magnification side along the optical axis Z: a first lens group G1; a first optical axis deflection unit R1 that deflects the optical axis Z toward a second lens group G2 from the first lens group G1; the second lens group G2; a second optical axis deflection unit R2 that deflects the optical axis Z toward a third lens group G3 from the second lens group G2; and the third lens group G3. The intermediate image MI is formed between the first optical axis deflection unit R1 and a surface closest to the magnification side in the first lens group G.

In FIG. 1, the intermediate image MI is schematically shown, and does not show an actual shape. Further, as the two optical axis deflection units R1 and R2, it is possible to use, for example, optical members, such as mirrors or prisms, capable of deflecting the optical axis.

In such a manner, in the imaging optical system forming the intermediate image MI, it is possible to ensure an appropriate back focal length and to reduce a diameter of the lens on the magnification side. As a result, the imaging optical system can be configured to be suitable for the wide angle.

Further, by providing the two optical axis deflection units R1 and R2, it is possible to reduce the size of the imaging optical system.

Further, in the imaging optical system, in a case where a projection lens section is set to be closer to the magnification side than the intermediate image MI and a relay lens section is set to be closer to the reduction side than the intermediate image MI, the two optical axis deflection units R1 and R2 are disposed in the relay lens section. Therefore, it is possible to reduce the size of the projection lens section, which is disposed on the magnification side and tends to increase in size.

In a case where the two optical axis deflection units are disposed in the imaging optical system, the two optical axis deflection units may be disposed in the space between the same lenses. In this case, it is difficult to set each optical axis deflection unit which has a size enough for the size of rays passing through the imaging optical system, and it becomes difficult to use the rays of the optical axis in projection of the image. In addition, in a case where the two optical axis deflection units are disposed in the space between the same lenses, a long air gap is necessary. Therefore, a problem arises in that the size of the imaging optical system becomes large.

On the other hand, in the imaging optical system of the present embodiment, the second lens group G2 is disposed between the two optical axis deflection units R1 and R2, and the two optical axis deflection units R1 and R2 are disposed in the space between different lenses. Thereby, the optical axis deflection units R1 and R2 each having a size enough for the rays passing through the imaging optical system can be disposed. Therefore, in the projection display device equipped with this imaging optical system, it is possible to widen the adjustment range of the projection range.

Figure 2:
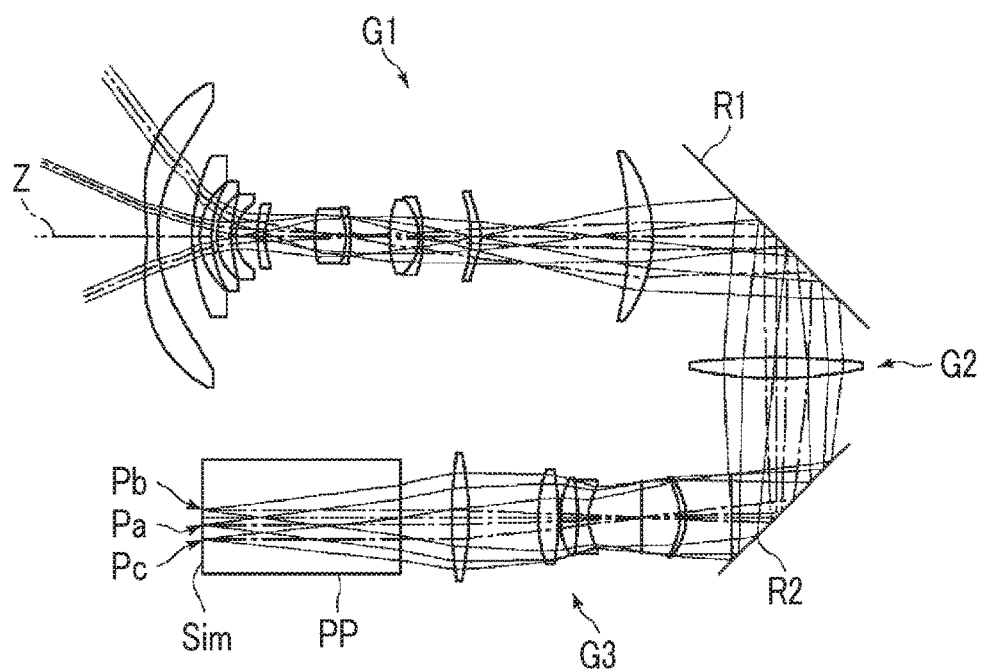
FIG. 2 is a cross-sectional view illustrating an example of a usable ray range in the imaging optical system of Example 1.
Figure 3:
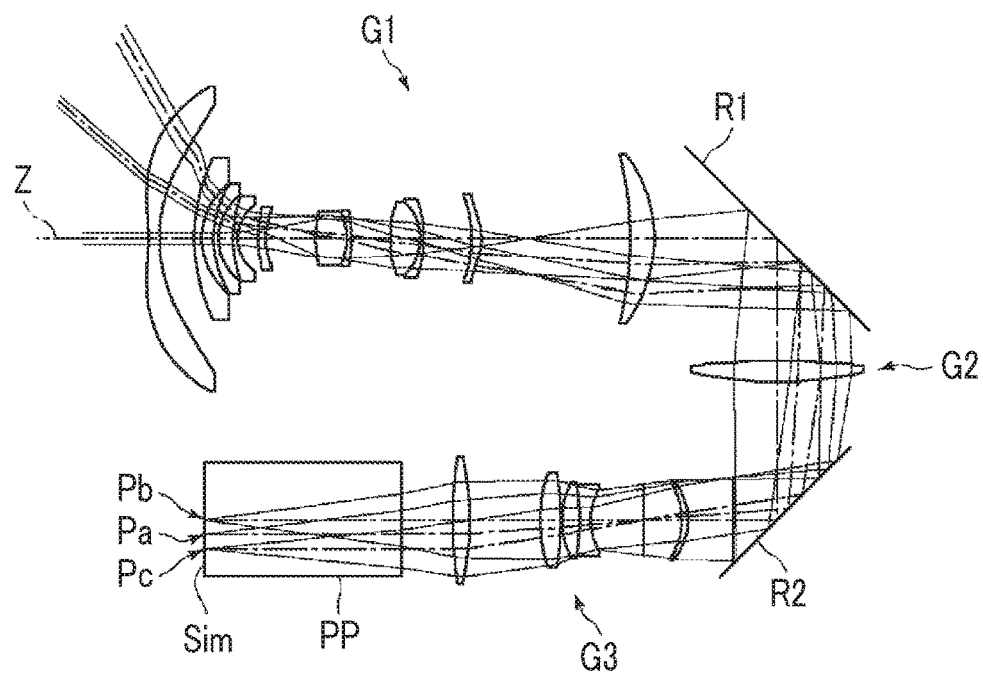
FIG. 3 is a cross-sectional view illustrating an example of a usable ray range in the imaging optical system of Example 1.
Figure 4:
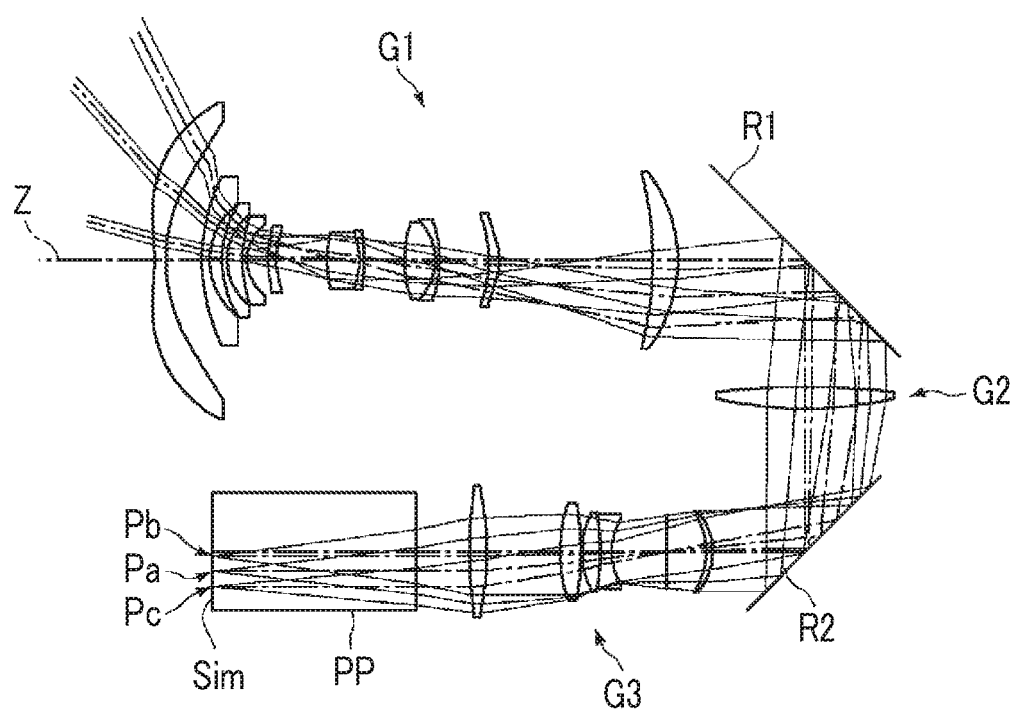
FIG. 4 is a cross-sectional view illustrating an example of a usable ray range in the imaging optical system of Example 1.

FIGS. 2 to 4 are cross-sectional views illustrating examples of the usable ray range in the imaging optical system of the present embodiment. The drawings each show a state in which the image display element is disposed on the image display surface Sim. In each drawing, the rays Pa from the center position of the image display element, the rays Pb from the upper end position of the image display element, the rays Pc from the lower end position of the image display element are also shown.

By mounting the imaging optical system of the present embodiment on the projection display device and shifting the image display element on the image display surface Sim in the vertical direction in the drawing, it is possible to widen the adjustment range of the projection range in accordance with the following aspects: an aspect in which an image is projected in the vertical direction of the optical axis Z as shown in FIG. 2; an aspect in which an image is projected by making the optical axis Z coincide with the upper end of the image display element as shown in FIG. 3; and an aspect in which an image is projected only in the upward direction of the optical axis Z as shown in FIG. 4.

In the imaging optical system of the present embodiment, it is preferable that the second lens group G2 has a positive refractive power. With such a configuration, it is possible to concentrate rays incident onto the first optical axis deflection unit R1 from the side of the second optical axis deflection unit R2. Therefore, it is possible to reduce the sizes of the two optical axis deflection units R1 and R2 before and after the second lens group G2.

Further, regarding the position at which the intermediate image MI is formed, the intermediate image MI may be formed between a surface closest to the magnification side in the first lens group G1 and a surface closest to the reduction side in the first lens group G1. The intermediate image MI may be formed between the first optical axis deflection unit R1 and a surface closest to the reduction side in the first lens group G1.

By forming the intermediate image MI between the surface closest to the magnification side in the first lens group G1 and the surface closest to the reduction side in the first lens group G1, it is possible to increase the length of the first lens group G1. In a case where the imaging optical system is mounted on the projection display device and an image is projected to the lower side from the optical axis Z, the rays of the projection display device body are unlikely to be blocked. Thus, there is an advantage in widening the adjustment range of the projection range. This aspect corresponds to Examples 1 to 6 to be described later.

By forming the intermediate image between the surface closest to the reduction side in the first lens group G1 and the first optical axis deflection unit R1, it is possible to reduce the length of the first lens group G1. In a case where the imaging optical system is mounted on the projection display device and an image is projected, it is possible to reduce the size of the imaging optical system including the projection display device and the screen. This aspect corresponds to Examples 7 and 8 to be described later.

Further, assuming that a focal length of the whole system is f and a focal length of the second lens group G2 is f2, it is preferable to satisfy Conditional Expression (1). By not allowing the result of Conditional Expression (1) to be equal to or less than the lower limit, the refractive power of the second lens group G2 is set to be positive. Thereby, it is possible to concentrate the rays incident into the first optical axis deflection unit R1 from the second optical axis deflection unit R2. Thus, it is possible to reduce the sizes of the two optical axis deflection units R1 and R2 before and after the second lens group G2. By not allowing the result of Conditional Expression (1) to be equal to or greater than the upper limit, it is possible to prevent the positive refractive power of the second lens group G2 from being excessively strong. As a result, there is an advantage in correcting spherical aberration. In addition, in a case where Conditional Expression (1-1) is satisfied, it is possible to obtain more favorable characteristics. By not allowing the result of Conditional Expression (1-1) to be equal to or less than the lower limit, it is possible to prevent the positive refractive power of the second lens group G2 from becoming excessively weak. As a result, there is an advantage in reducing the size of the first lens group G1.

$$0<|f1|/f2<0.1 \quad (1)$$

$$0.02<|f1|/f2<0.07 \quad (1-1)$$

Further, assuming that a distance on the optical axis Z from a surface closest to the magnification side in the first lens group G1 to the first optical axis deflection unit R1 is La and a distance on the optical axis Z from the second optical axis deflection unit R2 to a surface closest to the reduction side in the third lens group G3 is Lb, it is preferable to satisfy Conditional Expression (2). By not allowing the result of Conditional Expression (2) to be equal to or less than the lower limit, the surface closest to the magnification side in the first lens group G1 can be brought closer to the screen with reference to the position of the image display surface Sim. Thus, in a case where the imaging optical system is mounted on the projection display device and an image is projected to the lower side of the optical axis Z, the rays are unlikely to be blocked by the projection display device body. As a result, there is an advantage in widening the adjustment range of the projection range. By not allowing the result of Conditional Expression (2) to be equal to or greater than the upper limit, it is possible to prevent the surface closest to the magnification side in the first lens group G1 from becoming closer to the screen than the position of the image display surface Sim. Thus, in a case where the imaging optical system is mounted on the projection display device and an image is projected, it is possible to reduce the size of the imaging optical system including the projection display device and the screen. In addition, in a case where Conditional Expression (2-1) is satisfied, it is possible to obtain more favorable characteristics.

$$1.2<La/Lb<5 \quad (2)$$

$$1.5<La/Lb<4 \quad (2-1)$$

Further, it is preferable that the optical axis Z of the third lens group G3 is deflected by 180° with respect to the optical axis Z of the first lens group G1. With such a configuration, it is possible to reduce the size of the imaging optical system including the projection display device and the screen in a case where the imaging optical system is mounted on the projection display device and an image is projected.

In this case, it is preferable that the first lens group G1, the first optical axis deflection unit R1, the second lens group G2, and the second optical axis deflection unit R2 are integrally rotatable about the optical axis Z of the third lens group G3 as a rotation axis. With such a configuration, in a case where the aspect ratio of the display area of the image display element is different, it is possible to switch between the vertically long screen and the horizontally long screen every rotation of 45°.

Further, it is preferable that the first optical axis deflection unit R1 and the second optical axis deflection unit R2 deflect the optical axis Z by 90°. With such a configuration, there is an advantage in reducing the size of the imaging optical system.

Next, numerical examples of the imaging optical system of the present invention will be described. First, an imaging optical system of Example 1 will be described. FIG. 1 is a cross-sectional view illustrating a lens configuration of the imaging optical system of Example 1. In FIG. 1 and FIGS. 5 to 11 corresponding to Examples 2 to 8 to be described later, in a case where the optical axis is expanded, description is given under the assumption that the left side is the magnification side and the right side is the reduction side. It should be noted that the aperture stop St shown in the drawing does not necessarily indicate its size and shape, and indicates a position of the stop on the optical axis Z. Further, on-axis rays A and rays with the maximum angle of view B as the rays are denoted.

The imaging optical system of Example 1 is composed of, in order from the magnification side along the optical axis: a first lens group G1 consisting of eleven lenses L1a to L1k; a first optical axis deflection unit R1; a second lens group G2 consisting of only one lens L2a; a second optical axis deflection unit R2; and a third lens group G3 consisting of five lenses L3a to L3e.

Table 1 shows basic lens data of the imaging optical system of Example 1, Table 2 shows data about specification, and Table 3 shows data about aspheric surface coefficients. Hereinafter, meanings of the reference signs in the tables are, for example, as described in Example 1 a, and are basically the same as those in Examples 2 to 8.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows distances on the optical axis Z between the respective surfaces and the subsequent surfaces. Further, the column of n shows a refractive index of each optical element at the d line (a wavelength of 587.6 nm (nanometers)), and the column of νd shows an Abbe number of each optical element at the d line (a wavelength of 587.6 nm (nanometers)). Furthermore, the sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted.

In the data about the specification of Table 2, values of the focal length |f|, the back focal length Bf, the F number FNo., and the total angle of view 2ω (°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 3 shows the surface numbers of the aspheric surfaces and aspheric surface coefficients of the aspheric surfaces. The "E±n" (n: an integer) in numerical values of the aspheric surface coefficients of Table 3 indicates "×10$^{±n}$". The aspheric surface coefficients are values of the coefficients KA and Am in aspheric surface expression represented as the following expression.

$$Zd=C \cdot h^2/\{1+(1-KA \cdot C^2 \cdot h^2)^{1/2}\}+Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and Σ at the aspheric surface depth Zd means the sum with respect to m.

In the basic lens data and data about specification, "°" is used as a unit of angle, and "mm" (millimeter) is used as a unit of length, but appropriate different units may be used since the optical system can be used even in a case where the system is enlarged or reduced in proportion.

TABLE 1

Example 1 Lens Data (n, ν are based on the d line)

| Surface Number | Radius of Curvature | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |

TABLE 1-continued

Example 1 Lens Data (n, ν are based on the d line)

| Surface Number | Radius of Curvature | Surface Distance | n | ν |
|---|---|---|---|---|
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 65.8589 | | |
| 19 | −145.5518 | 10.7319 | 1.77250 | 49.60 |
| 20 | −62.3071 | 55.0000 | | |
| 21 | ∞ | 54.1401 | Mirror | |
| 22 | 318.5191 | 9.2901 | 1.64769 | 33.79 |
| 23 | −181.9989 | 61.7771 | | |
| 24 | ∞ | 40.0000 | Mirror | |
| 25 | 27.4511 | 2.8745 | 1.53172 | 48.84 |
| 26 | 33.1955 | 16.8747 | | |
| 27(Stop) | ∞ | 23.7186 | | |
| 28 | −27.7688 | 4.7775 | 1.85478 | 24.80 |
| 29 | 89.9979 | 0.1894 | | |
| 30 | 98.9499 | 7.8157 | 1.49700 | 81.54 |
| 31 | −37.0085 | 0.5627 | | |
| 32 | 127.2844 | 9.0281 | 1.49700 | 81.54 |
| 33 | −63.6949 | 31.2965 | | |
| 34 | 147.0807 | 7.3952 | 1.89286 | 20.36 |
| 35 | −193.5461 | 23.0227 | | |
| 36 | ∞ | 88.0000 | 1.51633 | 64.14 |
| 37 | ∞ | | | |

TABLE 2

Example 1 Specification (d line)

| |f| | 7.46 |
|---|---|
| Bf | 81.02 |
| FNo. | 2.50 |
| 2ω[°] | 135.0 |

TABLE 3

Example 1 Aspheric Surface Coefficient

| Surface Number | 1 | 2 | 17 | 18 |
|---|---|---|---|---|
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−12 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 12:
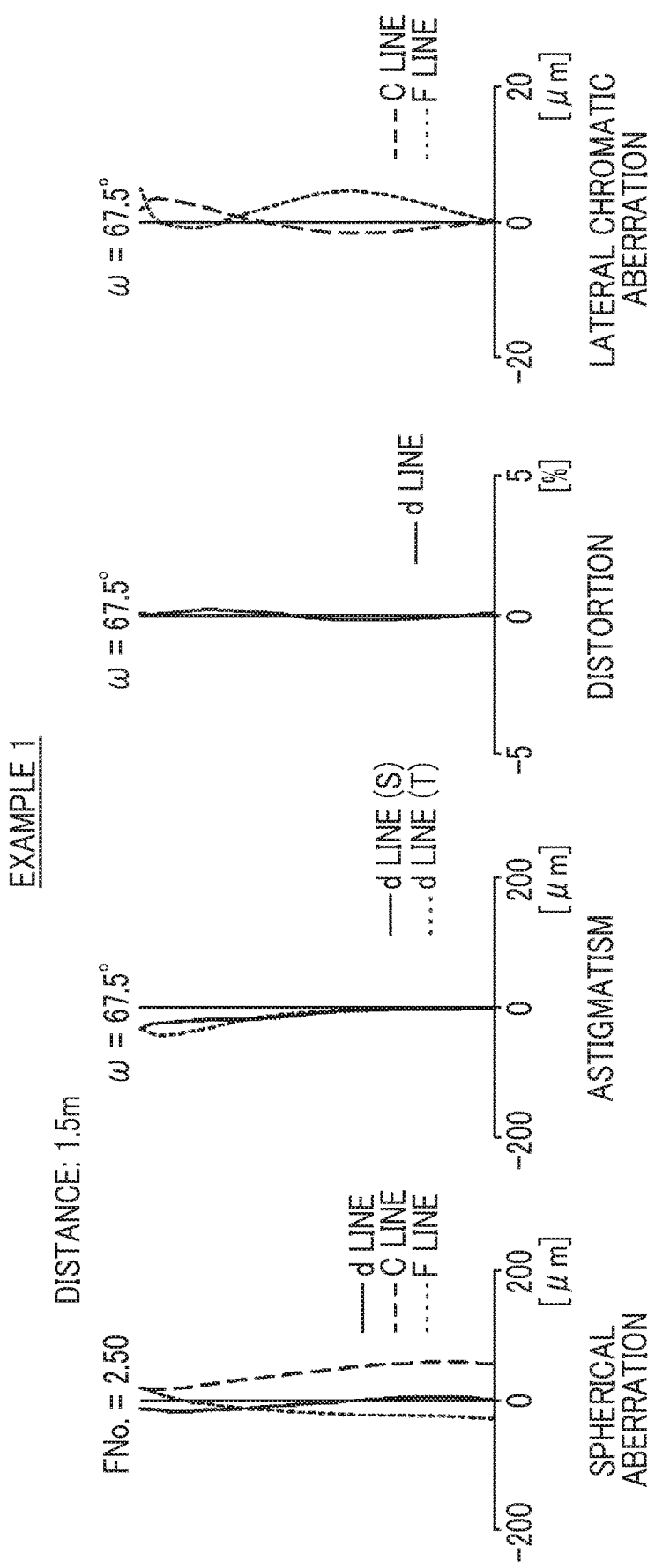
FIG. 12 is a diagram of aberrations of the imaging optical system of Example 1 of the present invention.

FIG. 12 shows a diagram of aberrations of the imaging optical system of Example 1. In addition, in order from the left side of FIG. 12, spherical aberration, astigmatism, distortion, and lateral chromatic aberration are shown in a case where the distance from the magnification side imaging surface to the first lens group G1 is set to 1.5 m. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, ω means a half angle of view.

Figure 5:
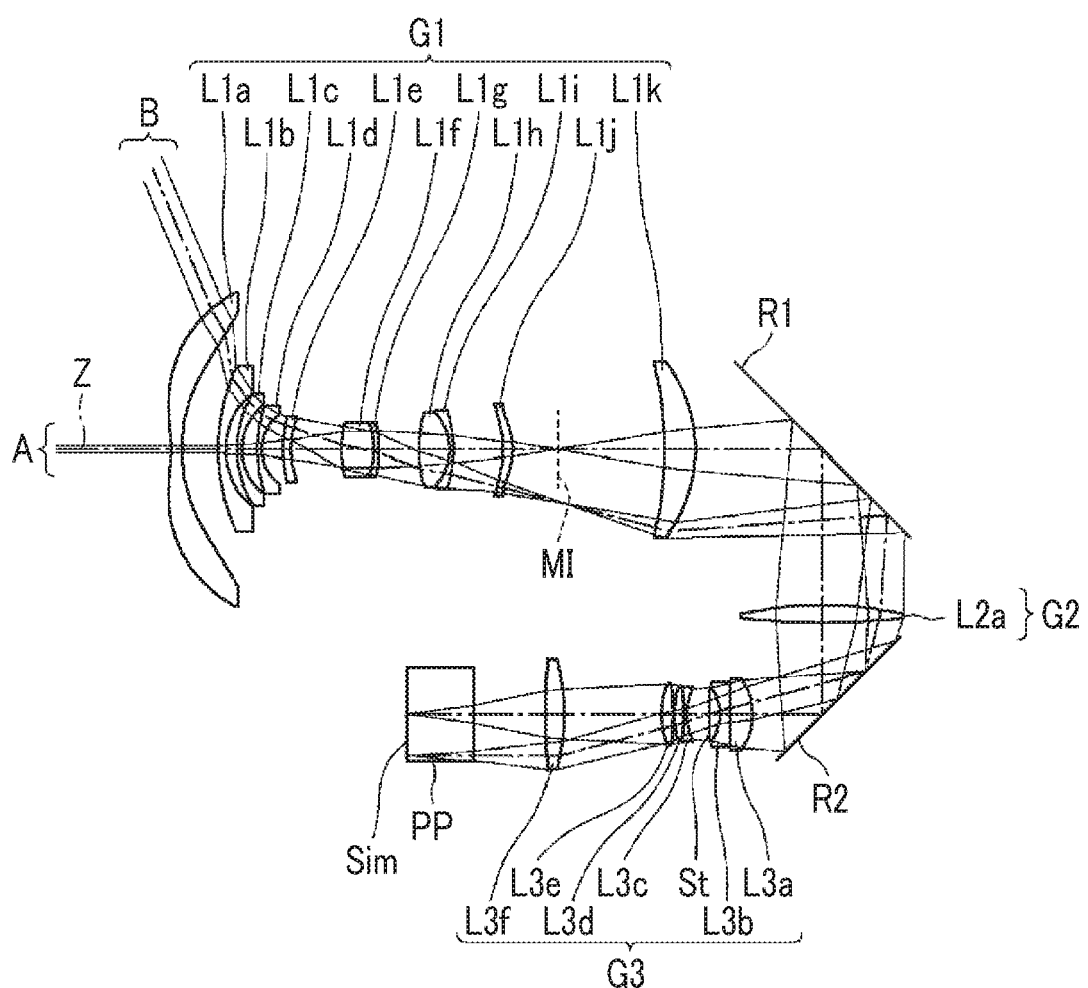
FIG. 5 is a cross-sectional view illustrating a lens configuration of an imaging optical system of Example 2 of the present invention.
Figure 13:
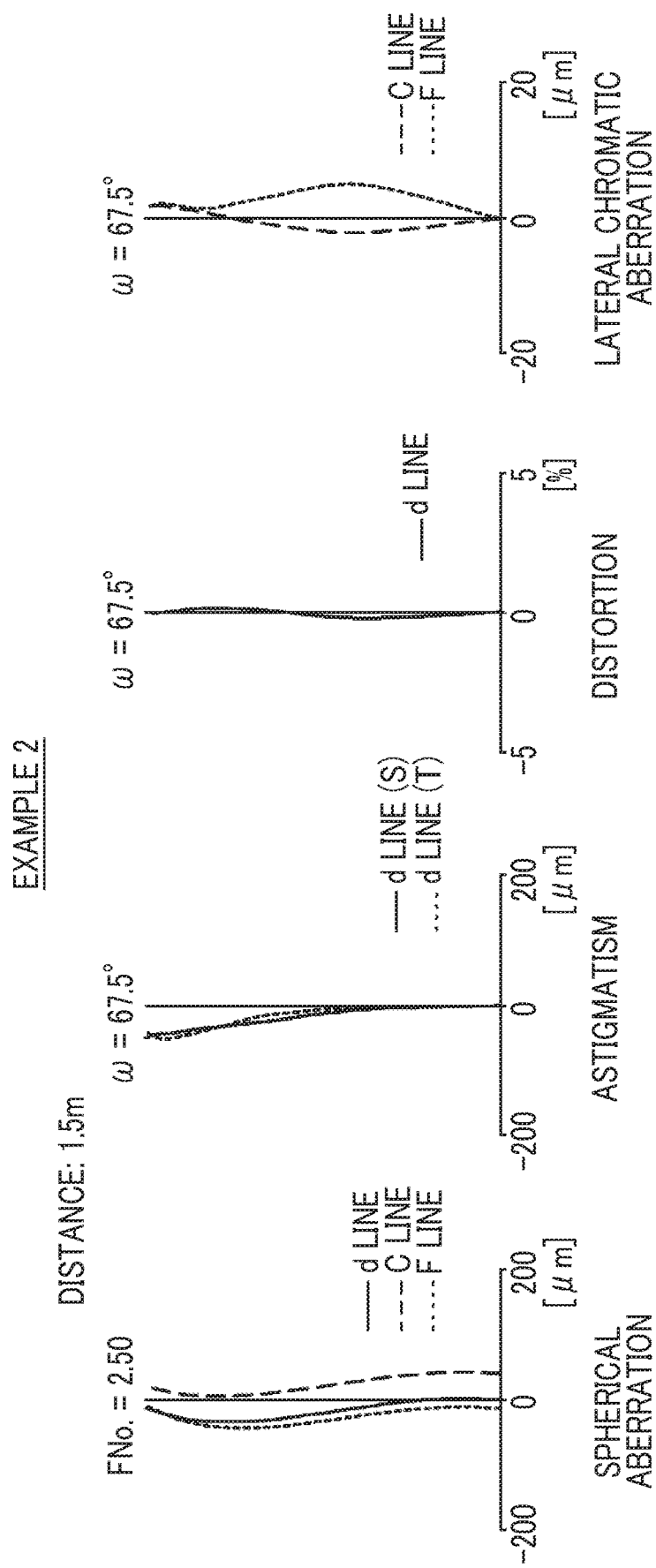
FIG. 13 is a diagram of aberrations of the imaging optical system of Example 2 of the present invention.

Next, an imaging optical system of Example 2 will be described. FIG. 5 is a cross-sectional view illustrating a lens configuration of the imaging optical system of Example 2. The configuration of the number of lenses of the imaging optical system of Example 2 is different from that of the imaging optical system of Example 1 in that the third lens group G3 consists of six lenses L3a to L3f. Further, Table 4 shows basic lens data of the imaging optical system of Example 2, Table 5 shows data about specification, and Table 6 shows data about aspheric surface coefficients. FIG. 13 shows aberration diagrams in a case where the distance from the magnification side imaging surface to the first lens group G1 is set to 1.5 m.

TABLE 4

Example 2 Lens Data (n, ν are based on the d line)

| Surface Number | Radius of Curvature | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |

TABLE 4-continued

Example 2 Lens Data (n, ν are based on the d line)

| Surface Number | Radius of Curvature | Surface Distance | n | ν |
|---|---|---|---|---|
| 12 | −32.0595 | 2.0000 | 1.80518 | 25.46 |
| 13 | −80.4358 | 17.4526 | | |
| 14 | 48.2890 | 13.4356 | 1.49700 | 81.54 |
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 65.3564 | | |
| 19 | −156.0746 | 13.2953 | 1.77250 | 49.60 |
| 20 | −62.6880 | 55.0000 | | |
| 21 | ∞ | 67.5587 | Mirror | |
| 22 | 163.0959 | 7.4701 | 1.85026 | 32.27 |
| 23 | −352.6655 | 39.9998 | | |
| 24 | ∞ | 30.0000 | Mirror | |
| 25 | 25.9154 | 10.2271 | 1.49700 | 81.54 |
| 26 | −215.5107 | 4.0091 | 1.51742 | 52.43 |
| 27 | 19.8552 | 4.6902 | | |
| 28(Stop) | ∞ | 9.7247 | | |
| 29 | −26.8569 | 1.2006 | 1.85478 | 24.80 |
| 30 | 96.6154 | 0.2449 | | |
| 31 | 142.0026 | 4.2556 | 1.49700 | 81.54 |
| 32 | −34.4511 | 0.1996 | | |
| 33 | 92.4923 | 5.0758 | 1.49700 | 81.54 |
| 34 | −35.2584 | 42.2219 | | |
| 35 | 92.7669 | 7.9994 | 1.89286 | 20.36 |
| 36 | −223.0200 | 31.0168 | | |
| 37 | ∞ | 29.0000 | 1.51633 | 64.14 |
| 38 | ∞ | | | |

TABLE 5

Example 2 Specification (d line)

| |f| | 7.46 |
|---|---|
| Bf | 50.11 |
| FNo. | 2.50 |
| 2ω[°] | 135.0 |

TABLE 6

Example 2 Aspheric Surface Coefficient

| Surface Number | 1 | 2 | 17 | 18 |
|---|---|---|---|---|
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.63693452.03E−09 |
| A8 | 2.4584736304E−10 | 3.3909943650E−10 |
| A10 | −3.2048099681E−13 | −7.6316904201E−13 |

Figure 6:
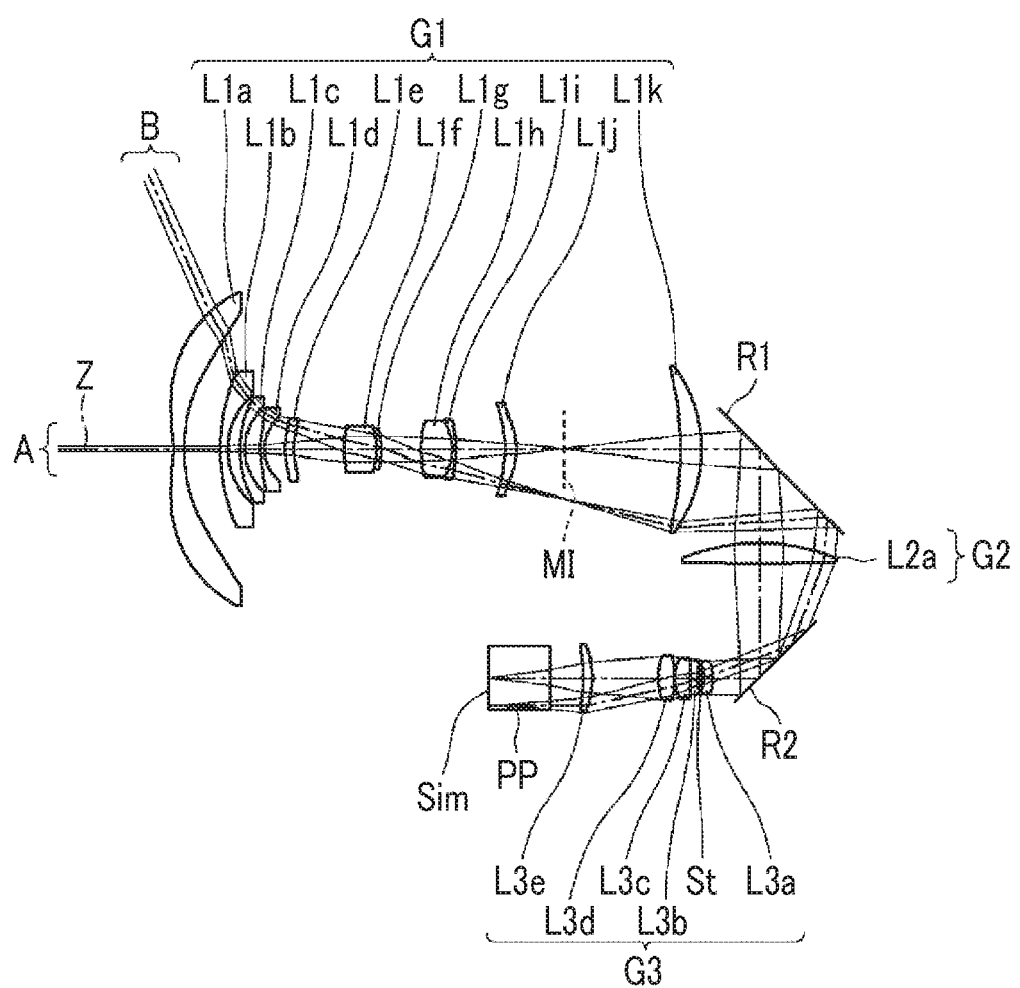
FIG. 6 is a cross-sectional view illustrating a lens configuration of an imaging optical system of Example 3 of the present invention.
Figure 14:
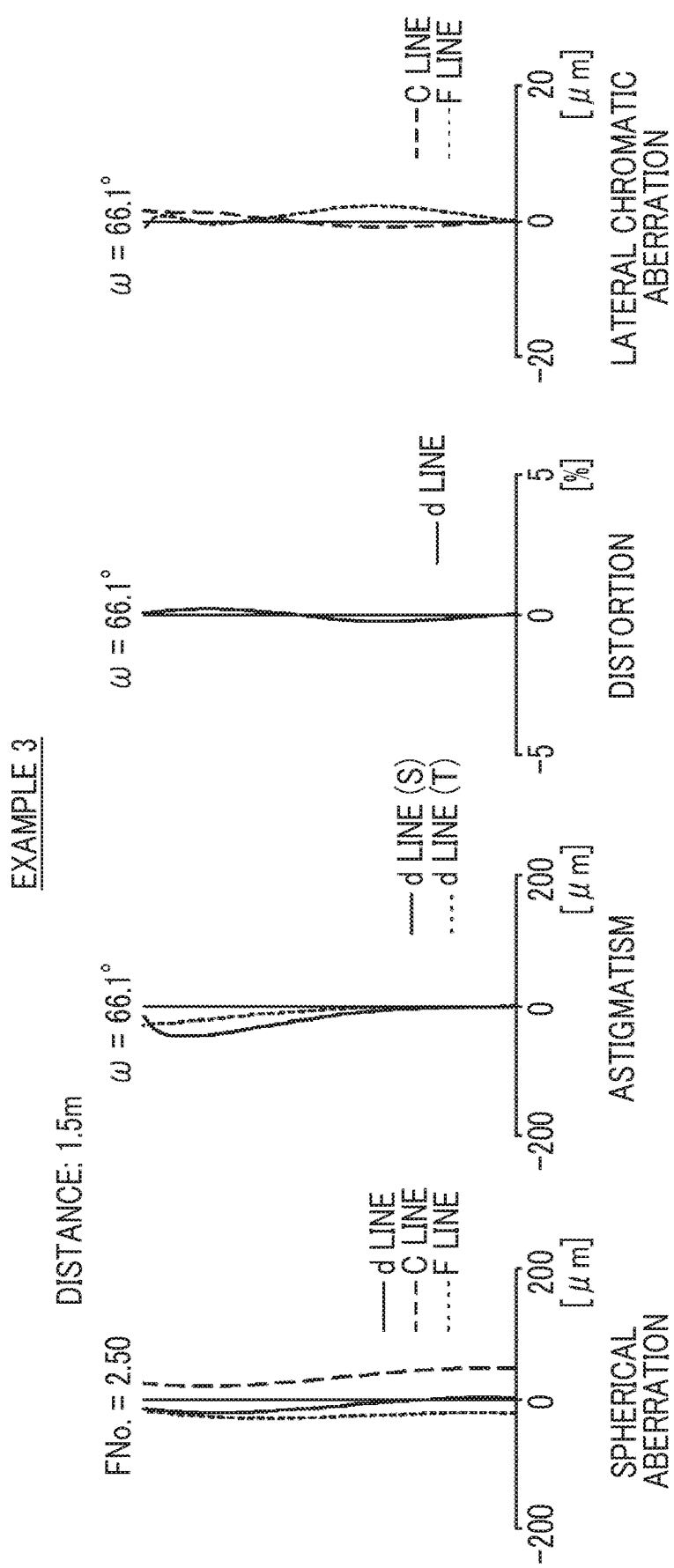
FIG. 14 is a diagram of aberrations of the imaging optical system of Example 3 of the present invention.

Next, an imaging optical system of Example 3 will be described. FIG. 6 is a cross-sectional view illustrating a lens configuration of the imaging optical system of Example 3. The imaging optical system of Example 3 is configured to have the same number of lenses as the imaging optical system of Example 1. Further, Table 7 shows basic lens data of the imaging optical system of Example 3, Table 8 shows data about specification, and Table 9 shows data about aspheric surface coefficients. FIG. 14 shows aberration diagrams in a case where the distance from the magnification side imaging surface to the first lens group G1 is set to 1.5 m.

TABLE 7

Example 3 Lens Data (n, ν are based on the d line)

| Surface Number | Radius of Curvature | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |

TABLE 7-continued

Example 3 Lens Data (n, ν are based on the d line)

| Surface Number | Radius of Curvature | Surface Distance | n | ν |
|---|---|---|---|---|
| 15 | −23.3246 | 1.6557 | 1.84666 | 23.78 |
| 16 | −54.0229 | 21.3983 | | |
| *17 | −40.1407 | 4.4589 | 1.69350 | 53.18 |

TABLE 7-continued

Example 3 Lens Data (n, ν are based on the d line)

| Surface Number | Radius of Curvature | Surface Distance | n | ν |
|---|---|---|---|---|
| *18 | −22.9550 | 71.1599 | | |
| 19 | −142.1976 | 9.1576 | 1.77250 | 49.60 |
| 20 | −60.3951 | 25.0000 | | |
| 21 | ∞ | 40.7181 | Mirror | |
| 22 | 91.6324 | 8.6203 | 1.85150 | 40.78 |
| 23 | −1534.8830 | 50.0219 | | |
| 24 | ∞ | 20.0000 | Mirror | |
| 25 | 19.0446 | 3.8912 | 1.51742 | 52.43 |
| 26 | 15.0625 | 1.0169 | | |
| 27(Stop) | ∞ | 1.9818 | | |
| 28 | −16.3944 | 3.0009 | 1.85478 | 24.80 |
| 29 | 1794.6165 | 0.2958 | | |
| 30 | −117.7123 | 6.3708 | 1.49700 | 81.54 |
| 31 | −19.0109 | 0.2168 | | |
| 32 | 57.6545 | 6.9101 | 1.49700 | 81.54 |
| 33 | −31.1924 | 28.7280 | | |
| 34 | 38.2949 | 4.2497 | 1.84666 | 23.78 |
| 35 | 152.4702 | 14.0205 | | |
| 36 | ∞ | 26.0000 | 1.51633 | 64.14 |
| 37 | ∞ | | | |

TABLE 8

Example 3 Specification (d line)

| | |
|---|---|
| \|f\| | 5.27 |
| Bf | 31.15 |
| FNo. | 2.50 |
| 2ω[°] | 132.2 |

TABLE 9

Example 3 Aspheric Surface Coefficient

| Surface Number | 1 | 2 | 17 | 18 |
|---|---|---|---|---|
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812486654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 7:
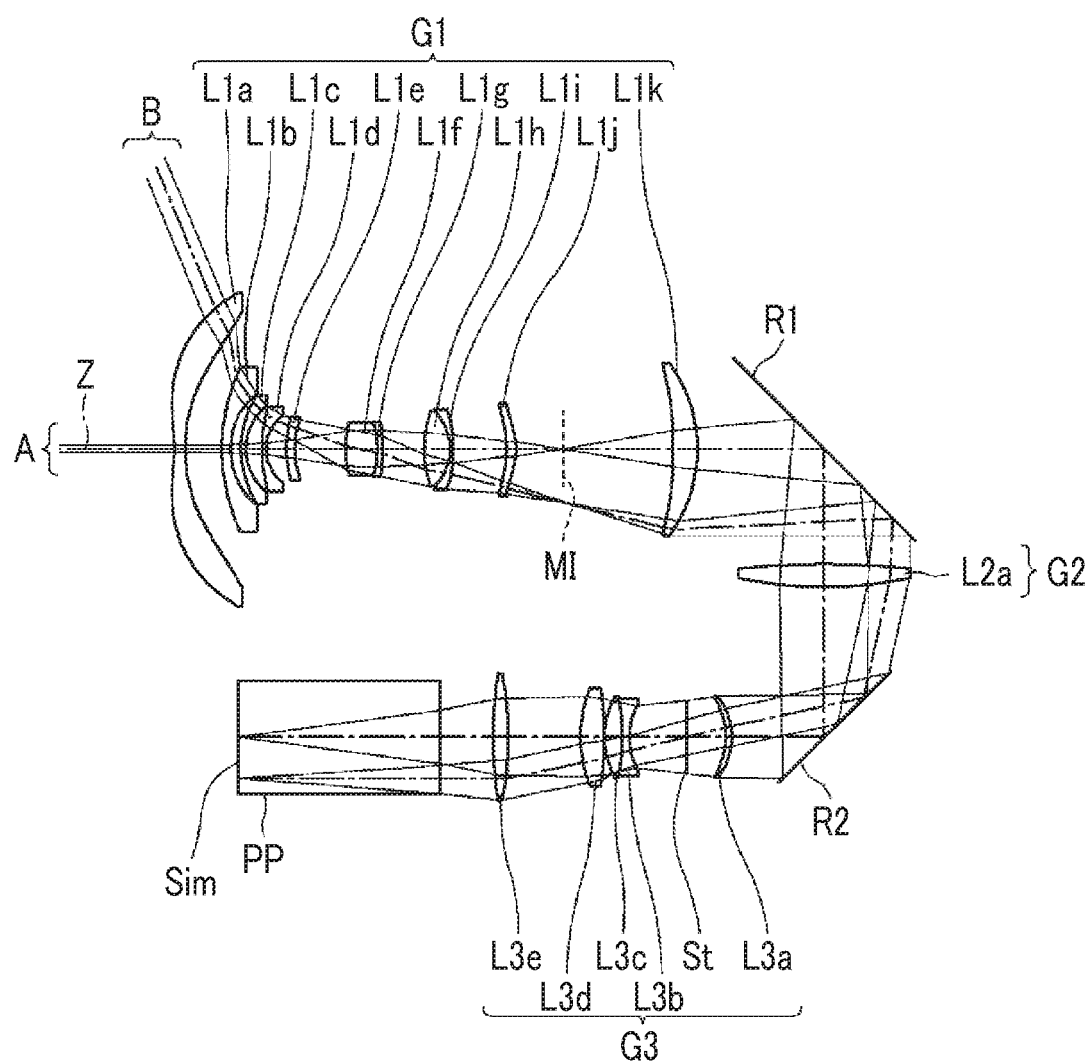
FIG. 7 is a cross-sectional view illustrating a lens configuration of an imaging optical system of Example 4 of the present invention.
Figure 15:
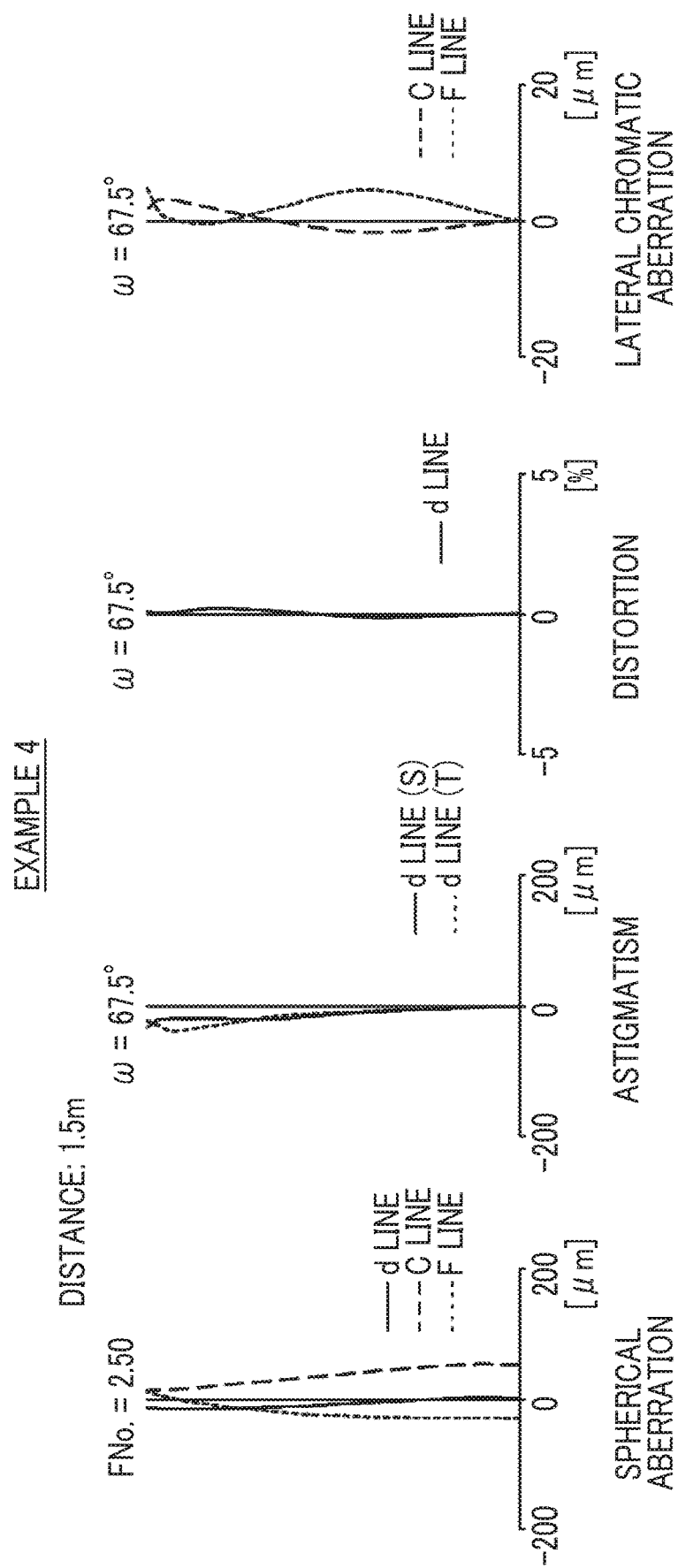
FIG. 15 is a diagram of aberrations of the imaging optical system of Example 4 of the present invention.

Next, an imaging optical system of Example 4 will be described. FIG. 7 is a cross-sectional view illustrating a lens configuration of the imaging optical system of Example 4. The imaging optical system of Example 4 is configured to have the same number of lenses as the imaging optical system of Example 1. Further, Table 10 shows basic lens data of the imaging optical system of Example 4, Table 11 shows data about specification, and Table 12 shows data about aspheric surface coefficients. FIG. 15 shows aberration diagrams in a case where the distance from the magnification side imaging surface to the first lens group G1 is set to 1.5 m.

TABLE 10

Example 4 Lens Data (n, ν are based on the d line)

| Surface Number | Radius of Curvature | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |
| 15 | −23.0827 | 1.5448 | 1.84666 | 23.78 |
| 16 | −52.9491 | 22.7616 | | |

TABLE 10-continued

Example 4 Lens Data (n, ν are based on the d line)

| Surface Number | Radius of Curvature | Surface Distance | n | ν |
|---|---|---|---|---|
| *17 | −44.7718 | 4.4646 | 1.69350 | 53.18 |
| *18 | −24.1589 | 67.8193 | | |
| 19 | −143.6049 | 10.2869 | 1.77250 | 49.60 |
| 20 | −63.4858 | 55.0000 | | |
| 21 | ∞ | 49.6763 | Mirror | |
| 22 | 314.4582 | 10.0000 | 1.64769 | 33.79 |
| 23 | −183.5563 | 65.4353 | | |
| 24 | ∞ | 40.0000 | Mirror | |
| 25 | 27.9061 | 2.8037 | 1.53172 | 48.84 |
| 26 | 33.6391 | 16.8130 | | |
| 27(Stop) | ∞ | 24.9860 | | |
| 28 | −27.9904 | 2.9125 | 1.85478 | 24.80 |
| 29 | 88.3774 | 0.1534 | | |
| 30 | 95.2615 | 7.6028 | 1.49700 | 81.54 |
| 31 | −37.2489 | 0.0298 | | |
| 32 | 134.3759 | 10.3731 | 1.49700 | 81.54 |
| 33 | −58.7490 | 30.9014 | | |
| 34 | 143.1924 | 6.4573 | 1.89286 | 20.36 |
| 35 | −191.1719 | 23.0216 | | |
| 36 | ∞ | 88.0000 | 1.51633 | 64.14 |
| 37 | ∞ | | | |

TABLE 11

Example 4 Specification (d line)

| |f| | 7.46 |
|---|---|
| Bf | 81.02 |
| FNo. | 2.50 |
| 2ω[°] | 135.0 |

TABLE 12

Example 4 Aspheric Surface Coefficient

| Surface Number | 1 | 2 | 17 | 18 |
|---|---|---|---|---|
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 8:
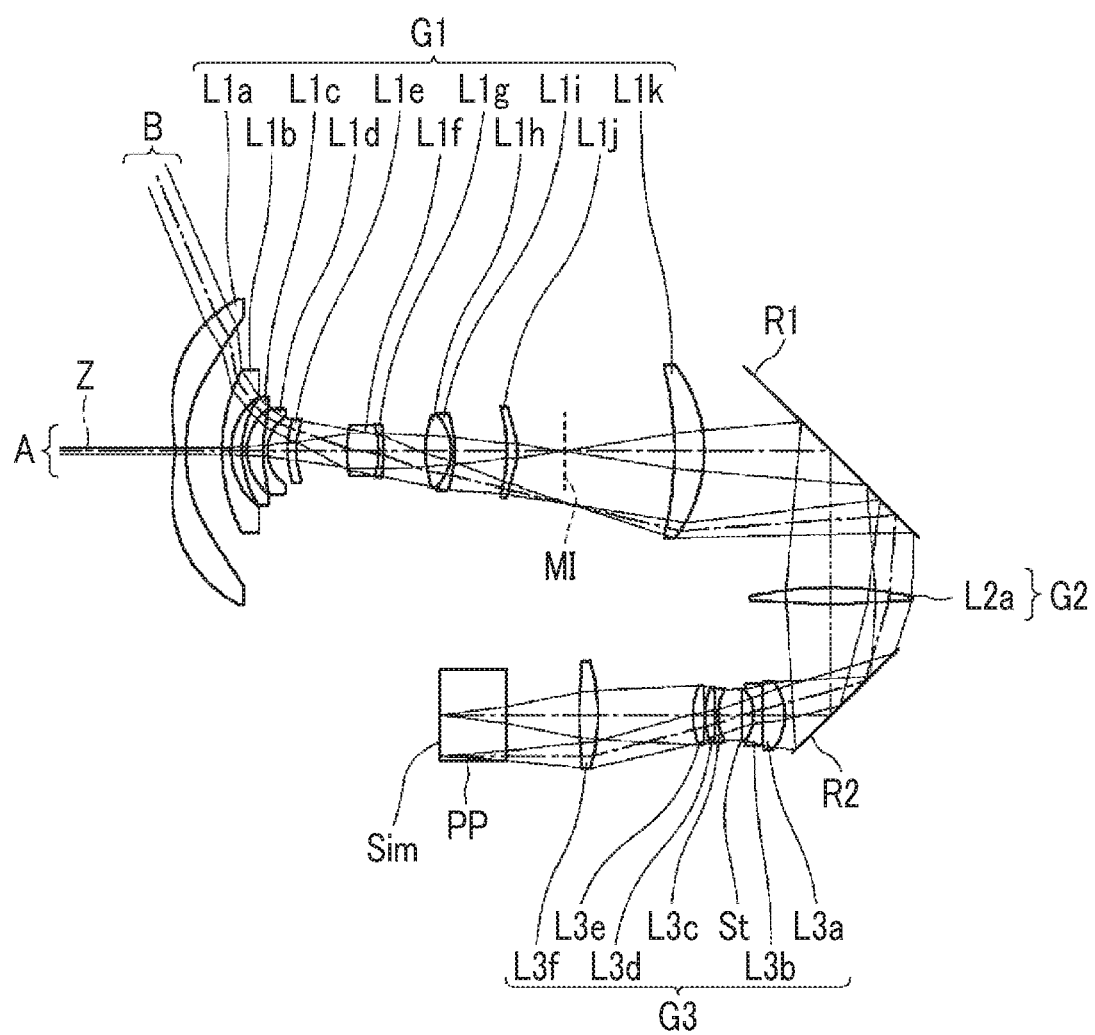
FIG. 8 is a cross-sectional view illustrating a lens configuration of an imaging optical system of Example 5 of the present invention.
Figure 16:
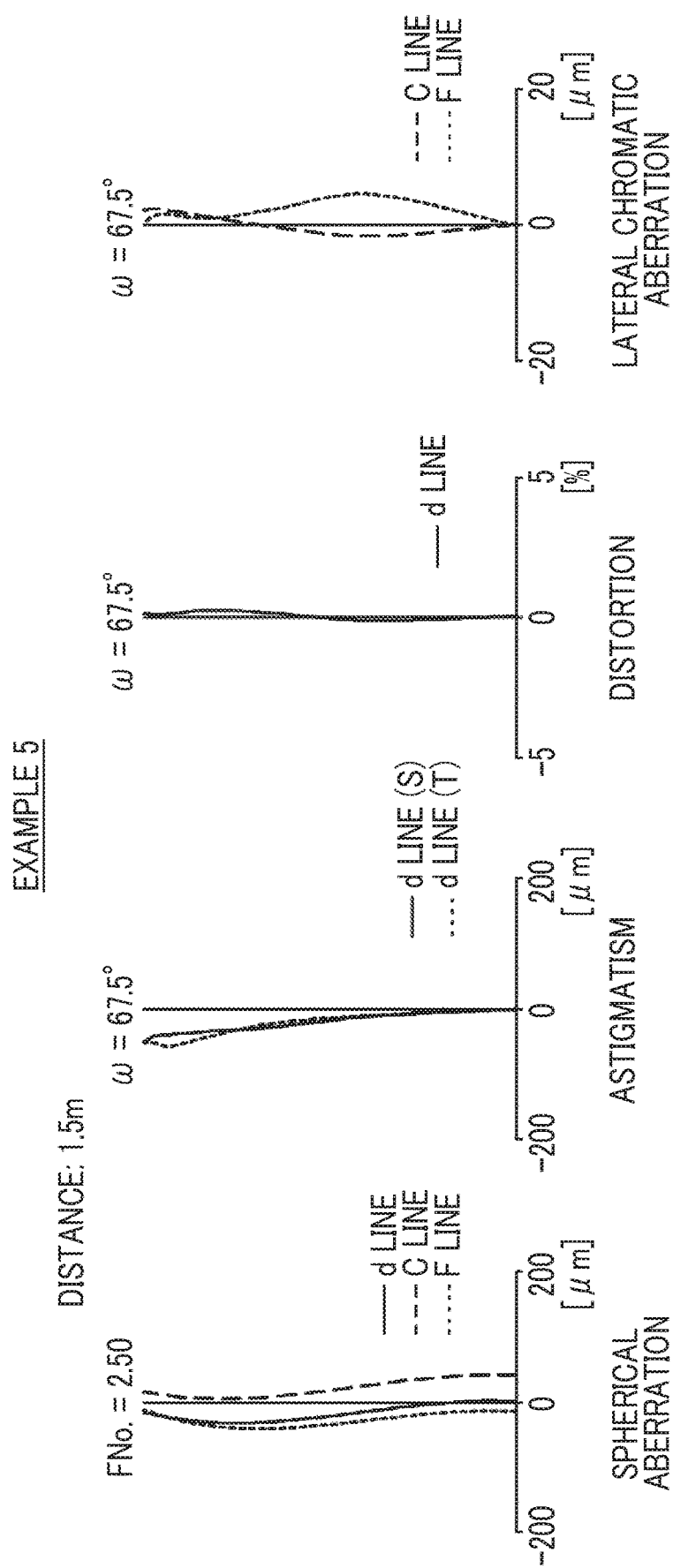
FIG. 16 is a diagram of aberrations of the imaging optical system of Example 5 of the present invention.

Next, an imaging optical system of Example 5 will be described. FIG. 8 is a cross-sectional view illustrating a lens configuration of the imaging optical system of Example 5. The configuration of the number of lenses of the imaging optical system of Example 5 is different from that of the imaging optical system of Example 1 in that the third lens group G3 consists of six lenses L3a to L3f. Further Table 13 shows basic lens data of the imaging optical system of Example 5, Table 14 shows data about specification, and Table 15 shows data about aspheric surface coefficients. FIG. 16 shows aberration diagrams in a case where the distance from the magnification side imaging surface to the first lens group G1 is set to 1.5 m.

TABLE 13

Example 5 Lens Data (n, ν are based on the d line)

| Surface Number | Radius of Curvature | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |
| 15 | −23.0827 | 1.5448 | 1.84666 | 23.78 |
| 16 | −52.9491 | 22.7616 | | |
| *17 | −44.7718 | 4.4646 | 1.69350 | 53.18 |
| *18 | −24.1589 | 67.6099 | | |
| 19 | −163.6408 | 12.9937 | 1.77250 | 49.60 |
| 20 | −64.5328 | 55.0000 | | |
| 21 | ∞ | 60.6168 | Mirror | |
| 22 | 164.3957 | 7.2654 | 1.85026 | 32.27 |
| 23 | −348.1374 | 50.0002 | | |
| 24 | ∞ | 20.0000 | Mirror | |
| 25 | 25.9355 | 9.9110 | 1.49700 | 81.54 |
| 26 | −173.3571 | 3.6793 | 1.51742 | 52.43 |
| 27 | 20.0589 | 4.9101 | | |
| 28(Stop) | ∞ | 10.3563 | | |
| 29 | −27.2389 | 1.1992 | 1.85478 | 24.80 |
| 30 | 109.7700 | 0.2577 | | |
| 31 | 178.0032 | 4.2013 | 1.49700 | 81.54 |
| 32 | −34.2999 | 0.1996 | | |
| 33 | 91.9048 | 5.1261 | 1.49700 | 81.54 |
| 34 | −36.0905 | 41.2675 | | |
| 35 | 87.7647 | 7.9994 | 1.89286 | 20.36 |
| 36 | −264.6701 | 31.0168 | | |
| 37 | ∞ | 29.0000 | 1.51633 | 64.14 |
| 38 | ∞ | | | |

TABLE 14

Example 5 Specification (d line)

| | |
|---|---|
| \|f\| | 7.46 |
| Bf | 50.11 |
| FNo. | 2.50 |
| 2ω[°] | 135.0 |

TABLE 15

Example 5 Aspheric Surface Coefficient

| Surface Number | 1 | 2 | 17 | 18 |
|---|---|---|---|---|
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 9:
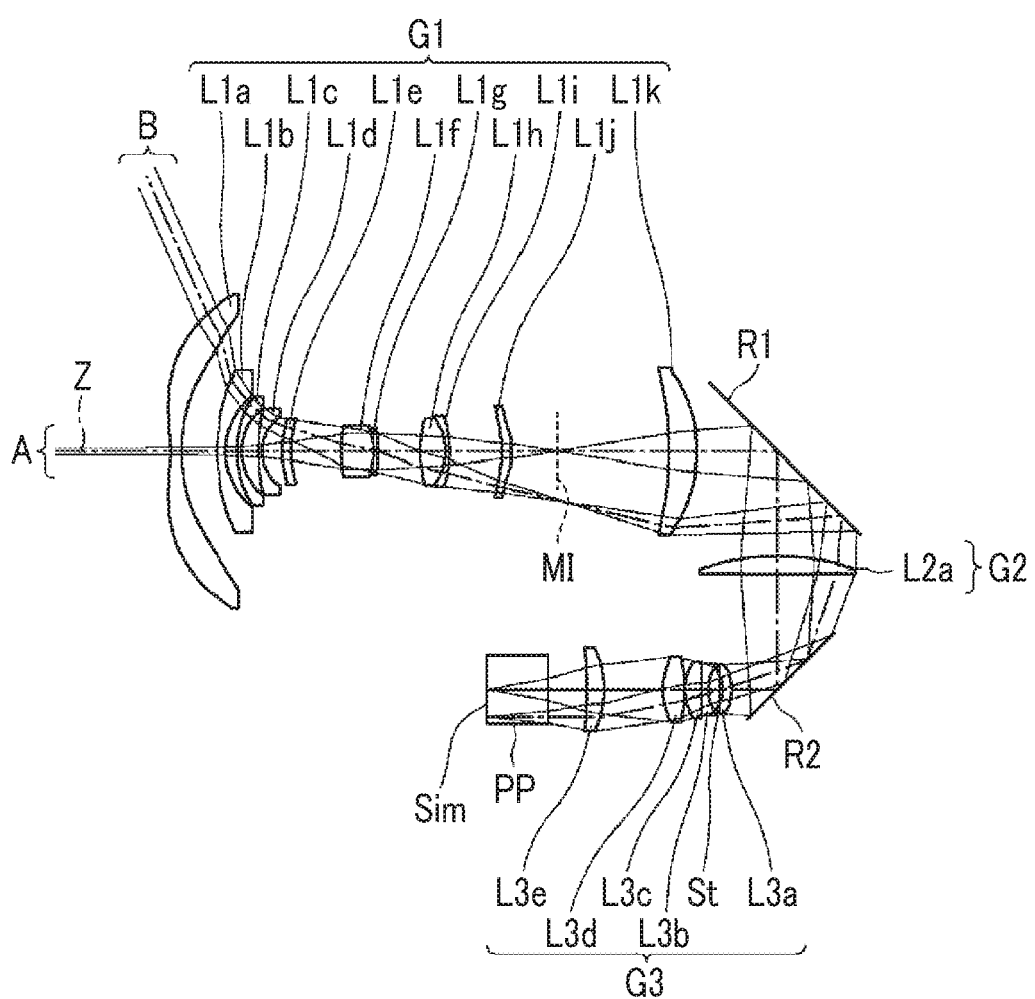
FIG. 9 is a cross-sectional view illustrating a lens configuration of an imaging optical system of Example 6 of the present invention.
Figure 17:
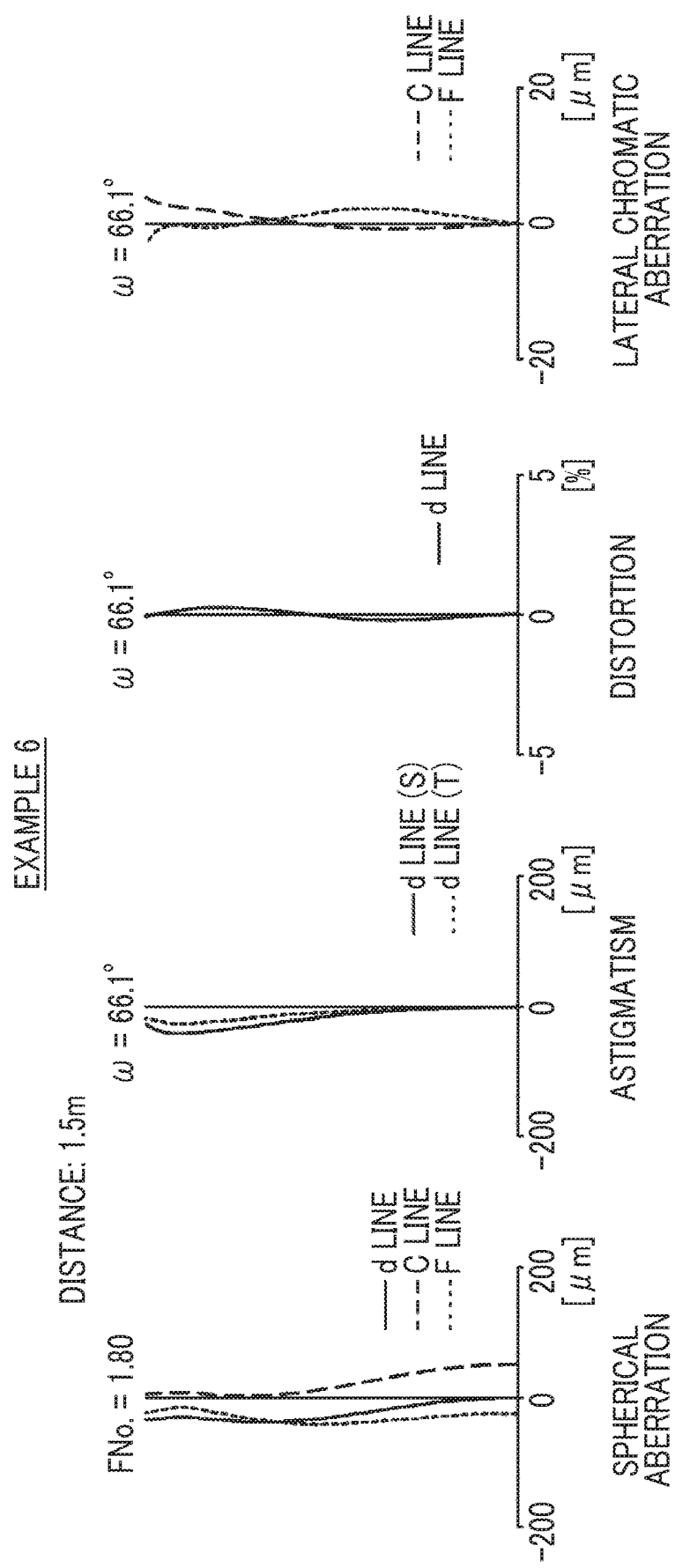
FIG. 17 is a diagram of aberrations of the imaging optical system of Example 6 of the present invention.

Next, an imaging optical system of Example 6 will be described. FIG. 9 is a cross-sectional view illustrating a lens configuration of the imaging optical system of Example 6. The imaging optical system of Example 6 is configured to have the same number of lenses as the imaging optical system of Example 1. Further, Table 16 shows basic lens data of the imaging optical system of Example 6, Table 17 shows data about specification, and Table 18 shows data about aspheric surface coefficients. FIG. 17 shows aberration diagrams in a case where the distance from the magnification side imaging surface to the first lens group G1 is set to 1.5 m.

TABLE 16

Example 6 Lens Data (n, ν are based on the d line)

| Surface Number | Radius of Curvature | Surface Distance | n | ν |
|---|---|---|---|---|
| *1 | −45.2918 | 5.0000 | 1.53158 | 55.08 |
| *2 | −1637.7166 | 15.5147 | | |

TABLE 16-continued

Example 6 Lens Data (n, ν are based on the d line)

| Surface Number | Radius of Curvature | Surface Distance | n | ν |
|---|---|---|---|---|
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |

TABLE 16-continued

Example 6 Lens Data (n, ν are based on the d line)

| Surface Number | Radius of Curvature | Surface Distance | n | ν |
|---|---|---|---|---|
| 15 | −23.0827 | 1.5448 | 1.84666 | 23.78 |
| 16 | −52.9491 | 22.7616 | | |
| *17 | −44.7718 | 4.4646 | 1.69350 | 53.18 |
| *18 | −24.1589 | 67.6529 | | |
| 19 | −145.1718 | 12.2753 | 1 77250 | 49.60 |
| 20 | −60.9882 | 35.0000 | | |
| 21 | ∞ | 45.3061 | Mirror | |
| 22 | 99.0531 | 8.1994 | 1.85150 | 40.78 |
| 23 | −1021.2325 | 50.0007 | | |
| 24 | ∞ | 20.0000 | Mirror | |
| 25 | 20.4083 | 4.0009 | 1.51742 | 52.43 |
| 26 | 16.3473 | 1.3149 | | |
| 27(Stop) | ∞ | 4.7448 | | |
| 28 | −18.4222 | 2.9997 | 1.85478 | 24.80 |
| 29 | 286.8492 | 0.3251 | | |
| 30 | −869.1801 | 6.8914 | 1.49700 | 81.54 |
| 31 | −21.8714 | 0.1991 | | |
| 32 | 76.5399 | 9.2470 | 1.49700 | 81.54 |
| 33 | −32.1345 | 25.6477 | | |
| 34 | 42.0180 | 7.4614 | 1.84666 | 23.78 |
| 35 | 155.02.28 | 16.8547 | | |

TABLE 16-continued

Example 6 Lens Data (n, ν are based on the d line)

| Surface Number | Radius of Curvature | Surface Distance | n | ν |
|---|---|---|---|---|
| 36 | ∞ | 26.0000 | 1.51633 | 64.14 |
| 37 | ∞ | | | |

TABLE 17

Example 6 Specification (d line)

| |f| | 5.27 |
|---|---|
| Bf | 33.98 |
| FNo. | 1.80 |
| 2ω[°] | 132.2 |

TABLE 18

Example 6 Aspheric Surface Coefficient

| Surface Number | 1 | 2 | 17 | 18 |
|---|---|---|---|---|
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877544409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 10:
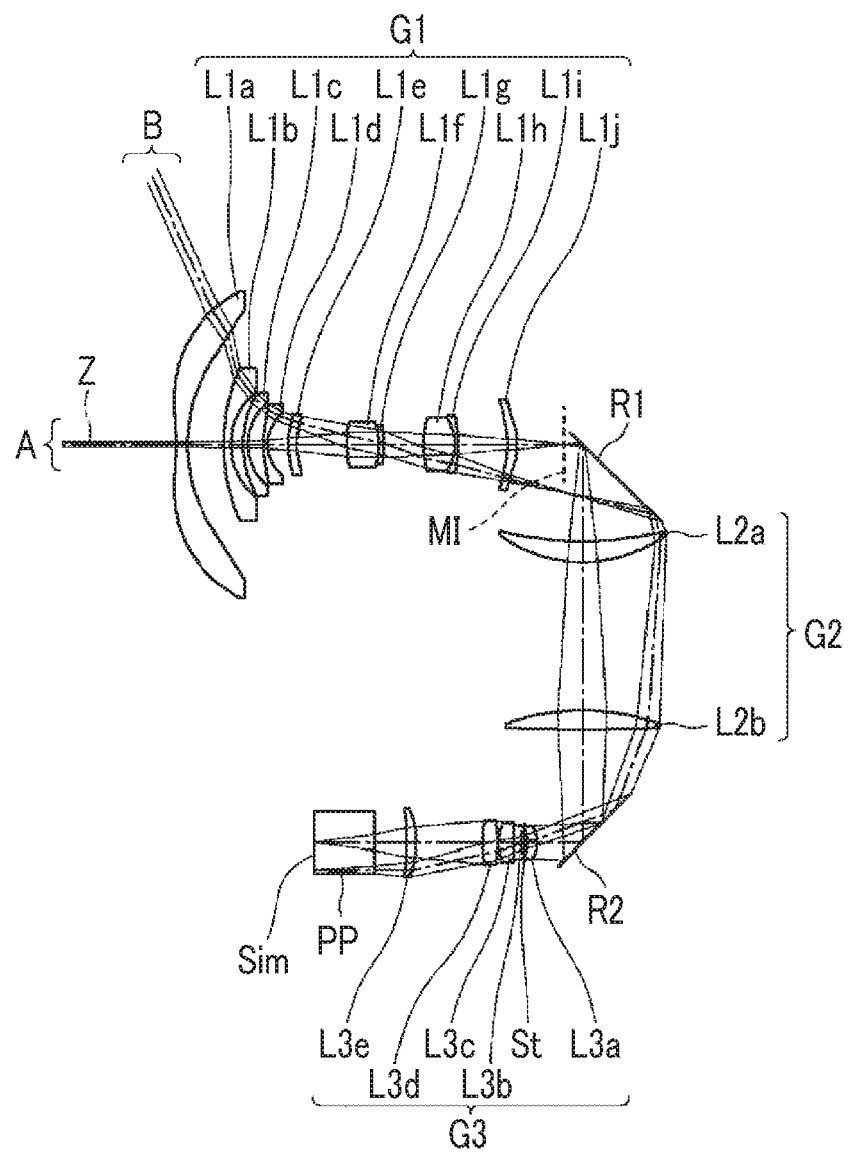
FIG. 10 is a cross-sectional view illustrating a lens configuration of an imaging optical system of Example 7 of the present invention.
Figure 18:
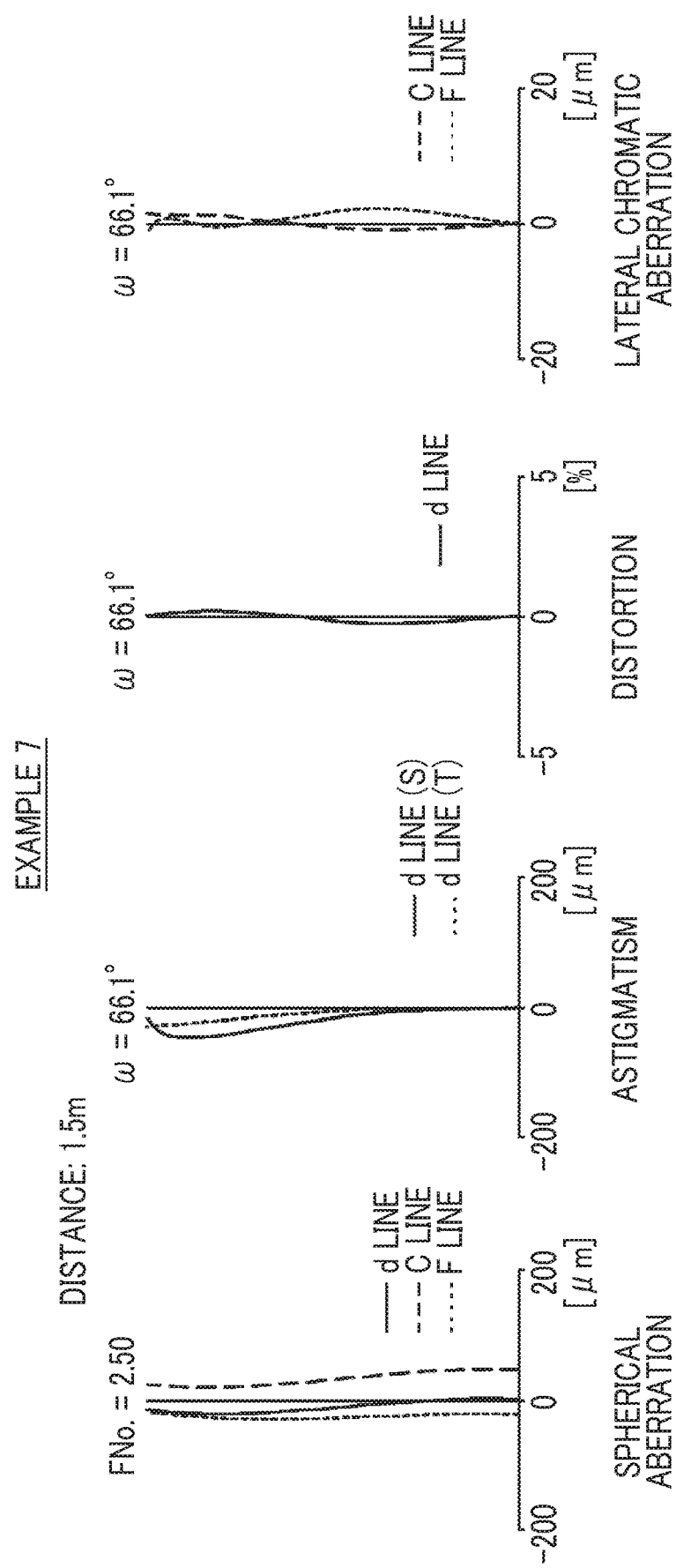
FIG. 18 is a diagram of aberrations of the imaging optical system of Example 7 of the present invention.

Next, an imaging optical system of Example 7 will be described. FIG. 10 is a cross-sectional view illustrating a lens configuration of the imaging optical system of Example 7. The imaging optical system of Example 7 is composed of, in order from the magnification side along the optical axis: a first lens group G1 consisting of ten lenses L1a to L1j; a first optical axis deflection unit R1; a second lens group G2 consisting of two lenses L2a and L2b; a second optical axis deflection unit R2; and a third lens group G3 consisting of five lenses L3a to L3e. Further, Table 19 shows basic lens data of the imaging optical system of Example 7, Table 20 shows data about specification, and Table 21 shows data about aspheric surface coefficients. FIG. 18 shows aberration diagrams in a case where the distance from the magnification side imaging surface to the first lens group G1 is set to 1.5 m.

TABLE 19

Example 7 Lens Data (n, ν are based on the d line)

| Surface Number | Radius of Curvature | Surface Distance | n | ν |
|---|---|---|---|---|
| *1 | −44.3204 | 5.0000 | 1.53158 | 55.08 |
| *2 | −1417.0510 | 15.4100 | | |

TABLE 19-continued

Example 7 Lens Data (n, ν are based on the d line)

| Surface Number | Radius of Curvature | Surface Distance | n | ν |
|---|---|---|---|---|
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |

TABLE 19-continued

Example 7 Lens Data (n, ν are based on the d line)

| Surface Number | Radius of Curvature | Surface Distance | n | ν |
|---|---|---|---|---|
| 36 | ∞ | 26.0000 | 1.51633 | 64.14 |
| 37 | ∞ | | | |

TABLE 20

Example 7 Specification (d line)

| | |
|---|---|
| \|f\| | 5.27 |
| Bf | 31.15 |
| FNo. | 2.50 |
| 2ω[°] | 132.2 |

TABLE 21

Example 7 Aspheric Surface Coefficient

| Surface Number | 1 | 2 | 17 | 18 |
|---|---|---|---|---|
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

TABLE 19-continued

Example 7 Lens Data (n, ν are based on the d line)

| Surface Number | Radius of Curvature | Surface Distance | n | ν |
|---|---|---|---|---|
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 28.1599 | | |
| 19 | ∞ | 43.0000 | Mirror | |
| 20 | −142.1976 | 9.1576 | 1.77250 | 49.60 |
| 21 | −60.3951 | 65.7181 | | |
| 22 | 91.6324 | 8.6203 | 1.85150 | 40.78 |
| 23 | −1534.8830 | 50.0219 | | |
| 24 | ∞ | 20.0000 | Mirror | |
| 25 | 19.0446 | 3.8912 | 1.51742 | 52.43 |
| 26 | 15.0625 | 1.0169 | | |
| 27(Stop) | ∞ | 1.9818 | | |
| 28 | −16.3944 | 3.0009 | 1.85478 | 24.80 |
| 29 | 1794.6165 | 0.2958 | | |
| 30 | −117.7123 | 6.3708 | 1.49700 | 81.54 |
| 31 | −19.0109 | 0.2168 | | |
| 32 | 57.6545 | 6.9101 | 1.49700 | 81.54 |
| 33 | −31.1924 | 28.7280 | | |
| 34 | 38.2949 | 4.2497 | 1.84666 | 23.78 |
| 35 | 152.4702 | 14.0205 | | |

Figure 11:
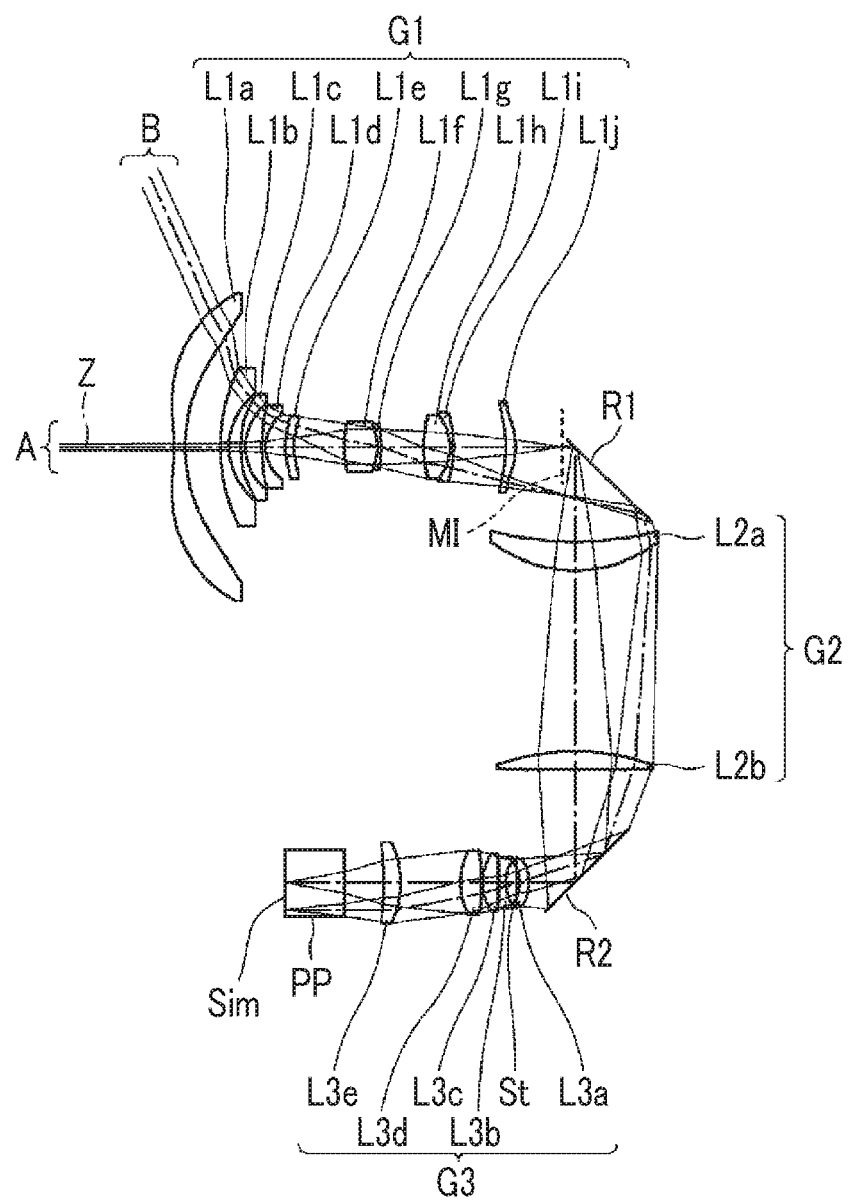
FIG. 11 is a cross-sectional view illustrating a lens configuration of an imaging optical system of Example 8 of the present invention.
Figure 19:
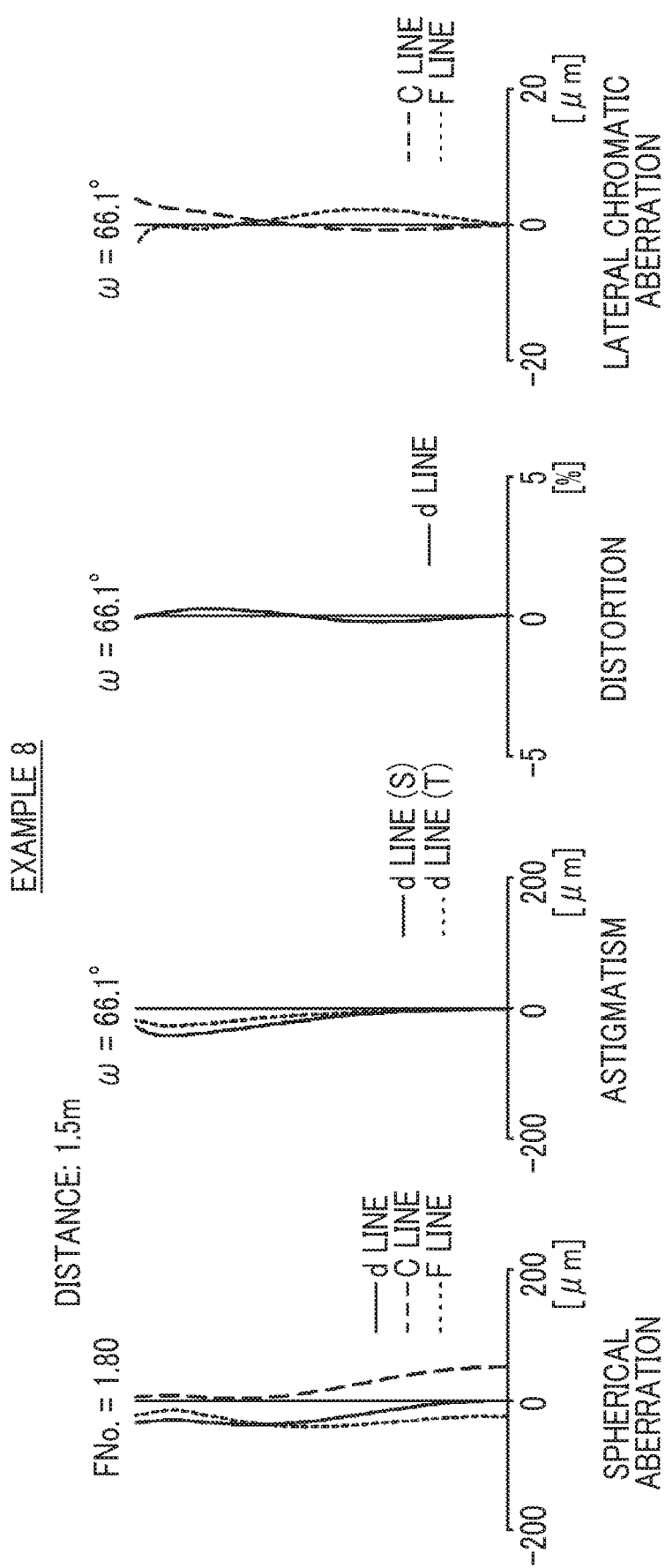
FIG. 19 is a diagram of aberrations of the imaging optical system of Example 8 of the present invention.

Next, an imaging optical system of Example 8 will be described. FIG. 11 is a cross-sectional view illustrating a lens configuration of the imaging optical system of Example 8. The imaging optical system of Example 8 is configured to have the same number of lenses as the imaging optical system of Example 7. Further, Table 22 shows basic lens data of the imaging optical system of Example 8, Table 23 shows data about specification, and Table 24 shows data about aspheric surface coefficients. FIG. 19 shows aberration diagrams in a case where the distance from the magnification side imaging surface to the first lens group G1 is set to 1.5 m.

TABLE 22

Example 8 Lens Data (n, ν are based on the d line)

| Surface Number | Radius of Curvature | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |

TABLE 22-continued

Example 8 Lens Data (n, ν are based on the d line)

| Surface Number | Radius of Curvature | Surface Distance | n | ν |
|---|---|---|---|---|
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |

TABLE 22-continued

Example 8 Lens Data (n, ν are based on the d line)

| Surface Number | Radius of Curvature | Surface Distance | n | ν |
|---|---|---|---|---|
| 12 | −32.4920 | 2.0000 | 1.80518 | 25.46 |
| 13 | −78.5978 | 18.2768 | | |
| 14 | 51.8603 | 11.1025 | 1.49700 | 81.54 |
| 15 | −23.0827 | 1.5448 | 1.84666 | 23.78 |
| 16 | −52.9491 | 22.7616 | | |
| *17 | −44.7718 | 4.4646 | 1.69350 | 53.18 |
| *18 | −24.1589 | 25.6529 | | |
| 19 | ∞ | 42.0000 | Mirror | |
| 20 | −145.1718 | 12.2753 | 1.77250 | 49.60 |
| 21 | −60.9882 | 80.3061 | | |
| 22 | 99.0531 | 8.1994 | 1.85150 | 40.78 |
| 23 | −1021.2325 | 50.0007 | | |
| 24 | ∞ | 20.0000 | Mirror | |
| 25 | 20.4083 | 4.0009 | 1.51742 | 52.43 |
| 26 | 16.3473 | 1.3149 | | |
| 27(Stop) | ∞ | 4.7448 | | |
| 28 | −18.4222 | 2.9997 | 1.85478 | 24.80 |
| 29 | 286.8492 | 0.3251 | | |
| 30 | −869.1801 | 6.8914 | 1.49700 | 81.54 |
| 31 | −21.8714 | 0.1991 | | |
| 32 | 76.5399 | 9.2470 | 1.49700 | 81.54 |
| 33 | −32.1345 | 25.6477 | | |
| 34 | 42.0180 | 7.4614 | 1.84666 | 23.78 |
| 35 | 155.0228 | 16.8547 | | |
| 36 | ∞ | 26.0000 | 1.51633 | 64.14 |
| 37 | ∞ | | | |

TABLE 23

Example 8 Specification (d line)

| | |
|---|---|
| |f| | 5.27 |
| Bf | 33.98 |
| FNo. | 1.80 |
| 2ω[°] | 132.2 |

TABLE 24

Example 8 Aspheric Surface Coefficient

| Surface Number | 1 | 2 | 17 | 18 |
|---|---|---|---|---|
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| Surface Number | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Table 25 shows values corresponding to the conditional expressions (1) and (2) of the imaging optical systems of Examples 1 to 8. It should be noted that, in the above-mentioned examples, the d line is set as the reference wavelength, and the values shown in Table 25 are values at the reference wavelength.

TABLE 25

| Expression Number | Conditional Expression | Example 1 | Example 2 | Example 3 | Example 4 |
|---|---|---|---|---|---|
| (1) | |f|/f2 | 0.041 | 0.056 | 0.052 | 0.041 |
| (2) | La/Lb | 1.94 | 2.36 | 3.31 | 1.97 |

| Expression Number | Conditional Expression | Example 5 | Example 6 | Example 7 | Example 8 |
|---|---|---|---|---|---|
| (1) | |f|/f2 | 0.056 | 0.050 | 0.068 | 0.061 |
| (2) | La/Lb | 2.61 | 3.18 | 2.31 | 2.11 |

As can be seen from the above-mentioned data, all the imaging optical systems of Examples 1 to 8 satisfy Conditional Expressions (1) and (2), and are imaging optical systems each of which is capable of using rays in both regions located with the optical axis interposed therebetween while having a small size.

Figure 20:
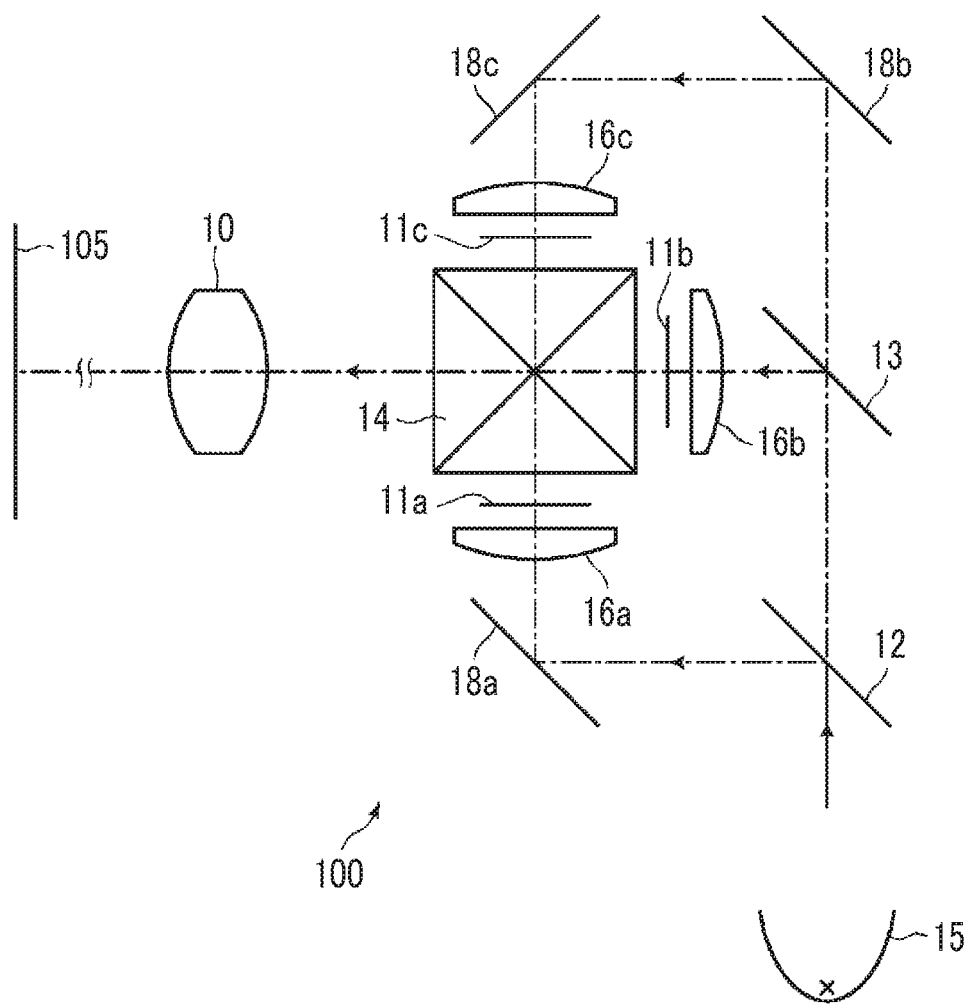
FIG. 20 is a schematic configuration diagram of a projection display device according to an embodiment of the present invention.

Next, a projection display device according to an embodiment of the present invention will be described. FIG. 20 is a schematic configuration diagram of the projection display device according to the embodiment of the present invention. The projection display device 100 shown in FIG. 20 has an imaging optical system 10 according to the embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical axis. In FIG. 20, the imaging optical system 10 is schematically illustrated. Further, an integrator is disposed between the light source 15 and the dichroic mirror 12, but illustration thereof is omitted in FIG. 20.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 21:
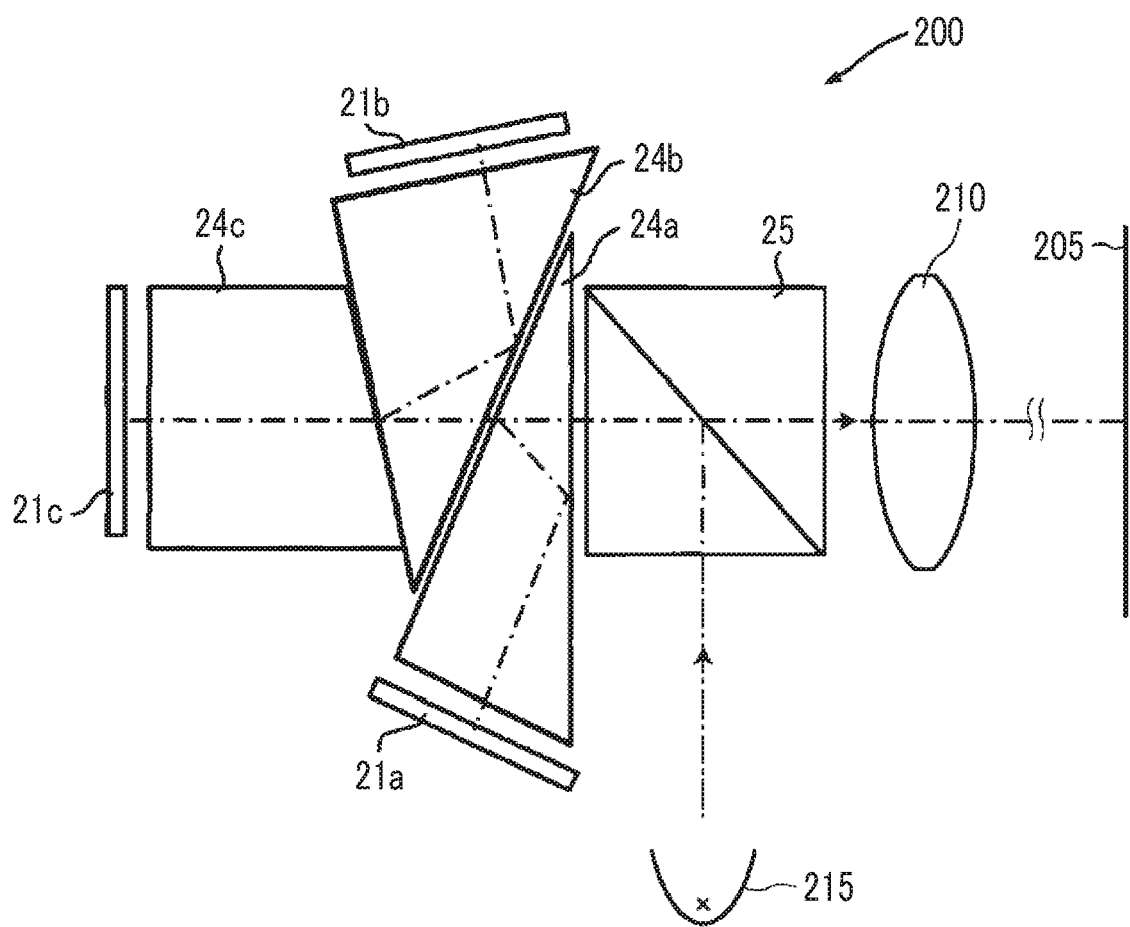
FIG. 21 is a schematic configuration diagram of a projection display device according to another embodiment of the present invention.

FIG. 21 is a schematic configuration diagram of a projection display device according to another embodiment of the present invention. The projection display device 200 shown in FIG. 21 has an imaging optical system 210 according to the embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 21, the imaging optical system 210 is schematically illustrated. Further, an integrator is disposed between the light source 215 and the polarization separating prism 25, but illustration thereof is omitted in FIG. 21.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 22:
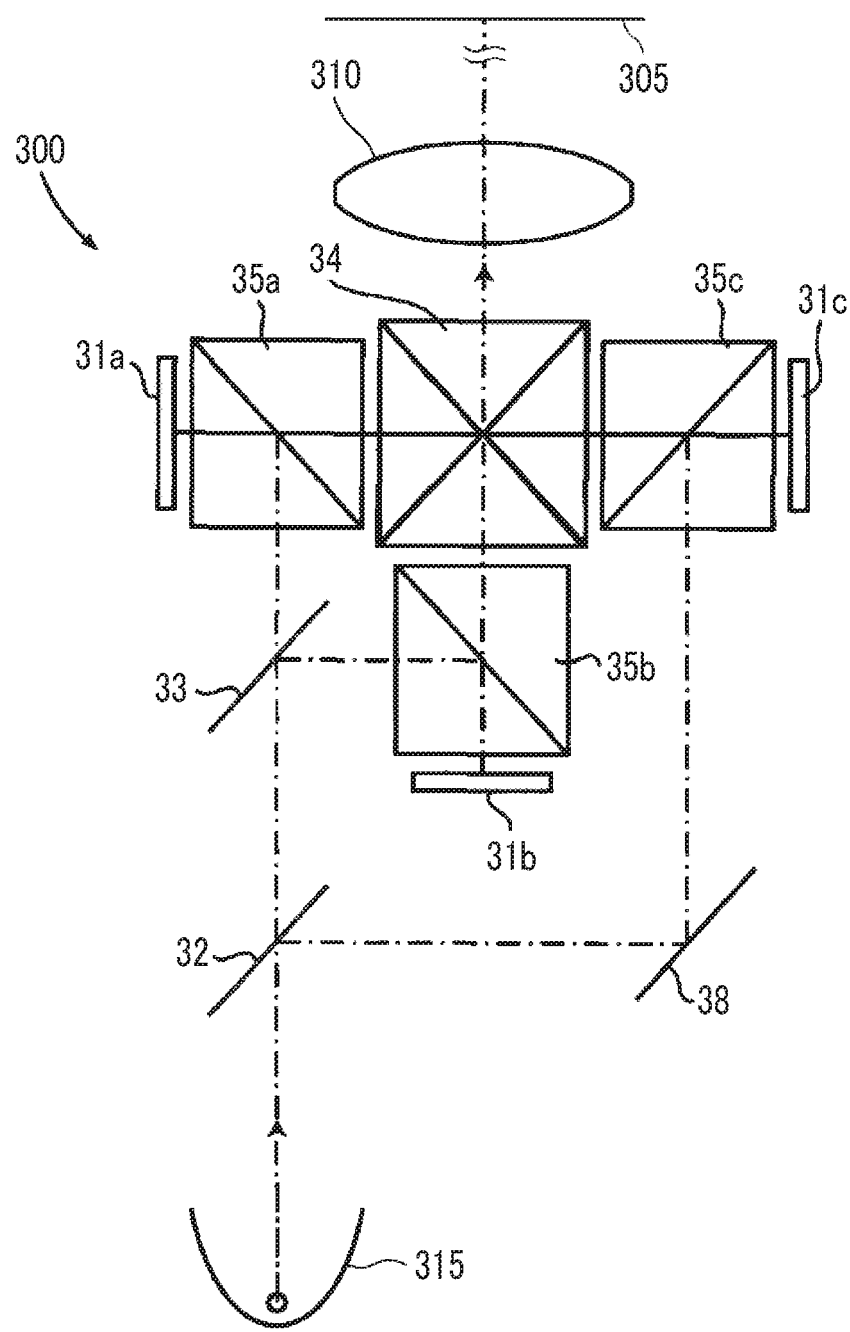
FIG. 22 is a schematic configuration diagram of a projection display device according to still another embodiment of the present invention.

FIG. 22 is a schematic configuration diagram of a projection display device according to still another embodiment of the present invention. The projection display device 300 shown in FIG. 22 has an imaging optical system 310 according to the embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical axis, and polarization separating prisms 35a to 35c. In FIG. 22, the imaging optical system 310 is schematically illustrated. Further, an integrator is disposed between the light source 315 and the dichroic mirror 32, but illustration thereof is omitted in FIG. 22.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 23:
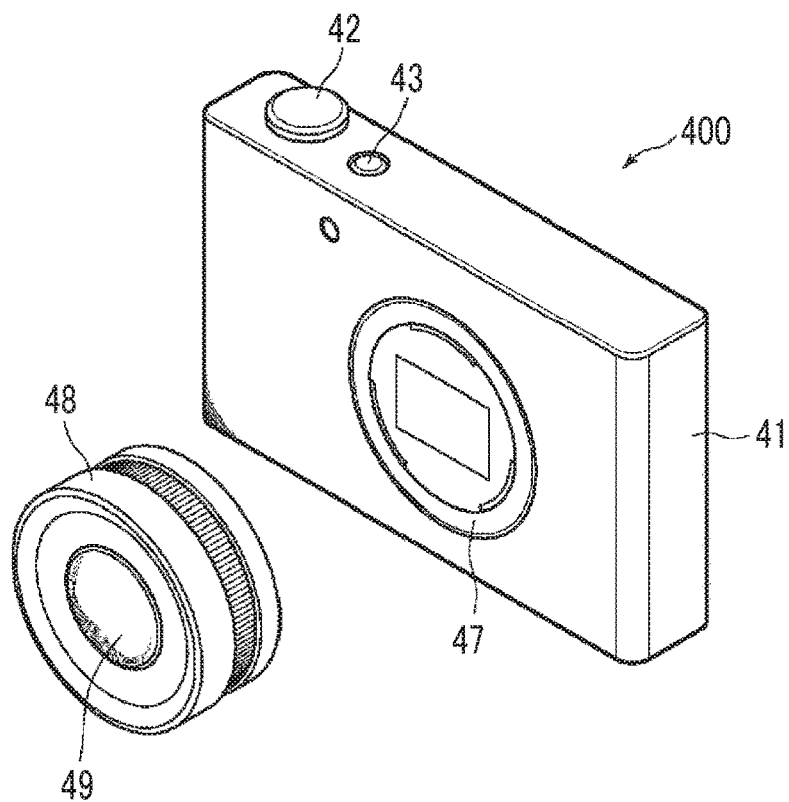
FIG. 23 is a perspective view of the front side of an imaging apparatus according to an embodiment of the present invention.
Figure 24:
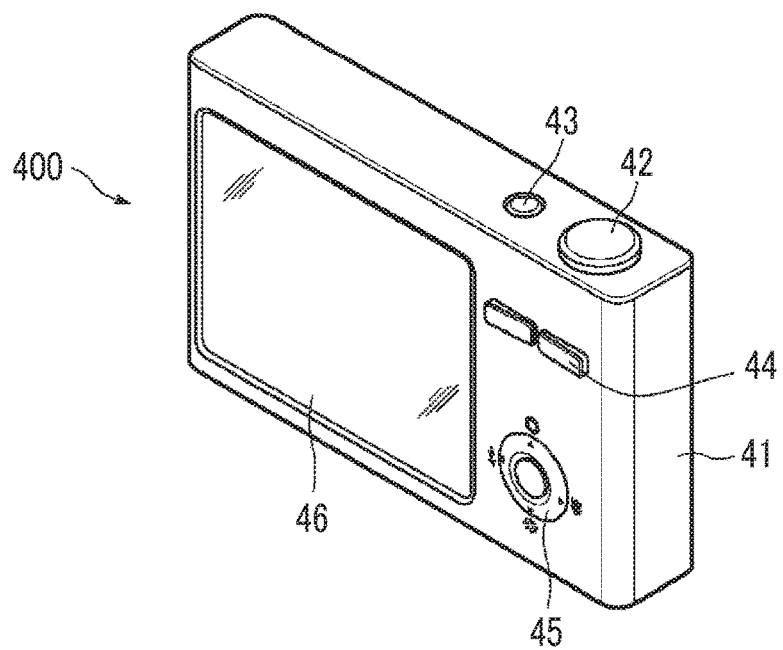
FIG. 24 is a perspective view of the rear side of the imaging apparatus shown in FIG. 23.

FIGS. 23 and 24 are external views of a camera 400 which is the imaging apparatus according to the embodiment of the present invention. FIG. 23 is a perspective view of the camera 400 viewed from the front side, and FIG. 24 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface distance, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD) element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
A: on-axis rays
B: rays with maximum angle of view
G1: first lens group
G2: second lens group
G3: third lens group
L1a to L3f: lens
MI: intermediate image
Pa: rays from center position of image display element
Pb: rays from upper end position of Pb image display element
Pc: rays from lower end position of Pc image display element
PP: optical member
R1: first optical axis deflection unit
R2: second optical axis deflection unit
Sim: image display surface
Z: optical axis

What is claimed is:

1. An imaging optical system that forms an intermediate image at a position conjugate to a magnification side imaging surface and re-forms the intermediate image on a reduction side imaging surface, the imaging optical system consisting of, in order from a magnification side along an optical axis:
a first lens group;
a first optical axis deflection unit that deflects the optical axis;
a second lens group;
a second optical axis deflection unit that deflects the optical axis; and
a third lens group,
wherein the intermediate image is formed between a surface closest to the magnification side in the first lens group and a surface closest to a reduction side in the first lens group.

2. The imaging optical system according to claim 1, wherein the second lens group has a positive refractive power.

3. The imaging optical system according to claim 1, wherein the intermediate image is formed between the first optical axis deflection unit and a surface closest to a reduction side in the first lens group.

4. The imaging optical system according to claim 1, wherein assuming that
a focal length of a whole system is f, and
a focal length of the second lens group is f2,
Conditional Expression (1) is satisfied $$0<|f|/f2<0.1 \qquad (1).$$

5. The imaging optical system according to claim 4, wherein Conditional Expression (1-1) is satisfied $$0.02|f|/f2<0.07 \qquad (1\text{-}1).$$

6. The imaging optical system according to claim 1, wherein assuming that
a distance on the optical axis from a surface closest to the magnification side in the first lens group to the first optical axis deflection unit is La, and
a distance on the optical axis from the second optical axis deflection unit to a surface closest to a reduction side in the third lens group is Lb,
Conditional Expression (2) is satisfied $$1.2<La/Lb<5 \qquad (2).$$

7. The imaging optical system according to claim 6, wherein Conditional Expression (2-1) is satisfied $$1.5<La/Lb<4 \qquad (2\text{-}1).$$

8. The imaging optical system according to claim 1, wherein the optical axis of the third lens group is deflected by 180° with respect to the optical axis of the first lens group.

9. The imaging optical system according to claim 8, wherein the first lens group, the first optical axis deflection unit, the second lens group, and the second optical axis deflection unit are integrally rotatable about the optical axis of the third lens group as a rotation axis.

10. The imaging optical system according to claim 1, wherein the first optical axis deflection unit and the second optical axis deflection unit deflect the optical axis by 90°.

11. A projection display device comprising:
a light valve from which an optical image is output based on image data; and
the imaging optical system according to claim 1,
wherein the imaging optical system projects the optical image, which is output from the light valve, onto a screen.

12. An imaging apparatus comprising the imaging optical system according to claim 1.

* * * * *